US009284443B2

(12) United States Patent
Oriani

(10) Patent No.: US 9,284,443 B2
(45) **Date of Patent: *Mar. 15, 2016**

(54) HEAT-STABILIZED ACRYLATE ELASTOMER COMPOSITION AND PROCESS FOR ITS PRODUCTION

(75) Inventor: Steven R Oriani, Landenberg, PA (US)

(73) Assignee: E. I. DU PONT DE NEMOURS AND COMPANY, Wilmington, DE (US)

( * ) Notice: Subject to any disclaimer, the term of this patent is extended or adjusted under 35 U.S.C. 154(b) by 843 days.

This patent is subject to a terminal disclaimer.

(21) Appl. No.: 13/529,543

(22) Filed: Jun. 21, 2012

(65) Prior Publication Data

US 2012/0328813 A1 Dec. 27, 2012

Related U.S. Application Data

(60) Provisional application No. 61/499,590, filed on Jun. 21, 2011.

(51) Int. Cl.
*C08L 33/00* (2006.01)
*C08L 77/00* (2006.01)

(52) U.S. Cl.
CPC ................ *C08L 33/00* (2013.01); *C08L 77/00* (2013.01); *Y10T 428/139* (2015.01)

(58) Field of Classification Search
CPC ...... C08L 33/00; C08L 77/00; Y10T 428/139
USPC ........................... 428/36.9; 524/514; 525/183
See application file for complete search history.

(56) References Cited

U.S. PATENT DOCUMENTS

| | | | | |
|---|---|---|---|---|
| 3,883,472 | A | 5/1975 | Greene et al. | |
| 3,899,378 | A * | 8/1975 | Wragg et al. | 156/73.5 |
| 3,904,588 | A | 9/1975 | Greene | |
| 3,965,055 | A | 6/1976 | Shichman et al. | |
| 4,174,358 | A | 11/1979 | Epstein | |
| 4,275,180 | A | 6/1981 | Clarke | |
| 4,310,638 | A | 1/1982 | Coran et al. | |
| 4,520,183 | A | 5/1985 | Subramanian | |
| 4,694,042 | A | 9/1987 | McKee et al. | |
| 5,070,145 | A | 12/1991 | Guerdoux | |
| 5,112,908 | A | 5/1992 | Epstein | |
| 5,166,278 | A | 11/1992 | Rao | |
| 5,591,798 | A | 1/1997 | Patel | |
| 5,688,868 | A | 11/1997 | Fish, Jr. | |
| 5,688,901 | A | 11/1997 | Fisch et al. | |
| 5,777,033 | A | 7/1998 | Venkataswamy et al. | |
| 5,866,658 | A | 2/1999 | Talkowski | |
| 5,948,503 | A | 9/1999 | Yamamoto et al. | |
| 6,133,375 | A | 10/2000 | Betremieux et al. | |
| 6,156,849 | A | 12/2000 | Moriyama et al. | |
| 7,015,260 | B2 | 3/2006 | Meloni | |
| 7,144,938 | B1 | 12/2006 | Feinberg et al. | |
| 7,402,631 | B2 | 7/2008 | Kubota et al. | |
| 7,544,757 | B2 | 6/2009 | Wu et al. | |
| 7,608,216 | B2 | 10/2009 | Park et al. | |
| 7,960,477 | B2 | 6/2011 | Weber et al. | |
| 8,142,316 | B2 | 3/2012 | Goettsch et al. | |
| 8,633,273 | B2 * | 1/2014 | Oriani | 524/514 |
| 8,664,317 | B2 * | 3/2014 | Oriani | 524/409 |
| 8,779,044 | B2 * | 7/2014 | Oriani | 524/255 |
| 8,791,180 | B2 * | 7/2014 | Oriani | 524/106 |
| 8,921,460 | B2 * | 12/2014 | Oriani | 523/467 |
| 8,940,824 | B2 * | 1/2015 | Oriani | 524/255 |
| 2002/0019477 | A1 | 2/2002 | Bartz et al. | |
| 2004/0242737 | A1 | 12/2004 | Topulos | |
| 2006/0004147 | A1 | 1/2006 | Park et al. | |
| 2006/0100368 | A1 | 5/2006 | Park | |
| 2007/0004854 | A1 | 1/2007 | Wu et al. | |
| 2007/0004855 | A1 | 1/2007 | Wu et al. | |
| 2007/0238833 | A1 | 10/2007 | Leboeuf et al. | |
| 2007/0265364 | A1 | 11/2007 | Oner-Deliomanli et al. | |
| 2008/0132370 | A1 | 6/2008 | Goettsch et al. | |
| 2008/0287600 | A1 | 11/2008 | Park et al. | |
| 2010/0029821 | A1 | 2/2010 | Palmer et al. | |
| 2010/0048821 | A1 | 2/2010 | Weber et al. | |
| 2011/0028621 | A1 | 2/2011 | Martens et al. | |
| 2012/0328812 | A1 | 12/2012 | Oriani | |
| 2012/0328813 | A1 | 12/2012 | Oriani | |
| 2012/0329914 | A1 | 12/2012 | Oriani | |
| 2012/0329925 | A1 | 12/2012 | Oriani | |
| 2012/0329926 | A1 | 12/2012 | Oriani | |

(Continued)

FOREIGN PATENT DOCUMENTS

| | | | |
|---|---|---|---|
| DE | 102008038943 | A1 | 2/2010 |
| EP | 0432911 | A1 | 6/1991 |
| EP | 0667367 | A2 | 8/1995 |
| JP | 7090136 | A | 4/1995 |
| JP | H10251452 | | 9/1998 |
| JP | 2001-191387 | | 7/2001 |
| JP | 2009204097 | | 10/2009 |
| WO | 9634048 | A1 | 10/1996 |

OTHER PUBLICATIONS

Jha ("Thermoplastic Elastomeric Blends of Nylon-6/Acrylate Rubber: Influence of Interaction on Mechanical and Dynamic Mechanical Thermal Properties" Rubber Chemistry and Technology, vol. 70 (1997) p. 798-814).*
Jha et al. "Thermoplastic Elastomeric Blends of Nylon-6/Acrylate Rubber: Influence of Interaction on Mechanical and Dynamic Mechanical Thermal Properties" Rubber Chemistry and Technology vol. 70 (1997) p. 798-814.
Zeon Chemicals L.P. HyTemp® Technical Manual, Rev. Jan. 2009, p. 59-61 (2009).
Zeon Chemicals L.P. HyTemp® Technical Manual, Rev. Jan. 2009, p. 46 (2009).
Unimatec Chemicals Germany Noxtite ACM (basic) Jan. 2007, pp. 56-57.
International Search report for PCT/US2012/043551, Oct. 1, 2012.
International Search Report for PCT/043561 Oct. 1, 2012.

* cited by examiner

*Primary Examiner* — Jafar Parsa
*Assistant Examiner* — Amy C Bonaparte

(57) ABSTRACT

Polyamide-filled acrylate copolymer compositions comprising a continuous acrylate copolymer phase and a discontinuous polyamide phase are produced by a melt mixing process. When crosslinked with diamine curatives the polyamide-filled acrylate copolymer compositions exhibit enhanced resistance to heat aging compared to carbon black-reinforced acrylate copolymer compositions.

14 Claims, No Drawings

HEAT-STABILIZED ACRYLATE ELASTOMER COMPOSITION AND PROCESS FOR ITS PRODUCTION

CROSS REFERENCE TO RELATED APPLICATION

This application claims priority from U.S. Patent Application Ser. No. 61/499,590, filed on Jun. 21, 2011, which is incorporated herein by reference in its entirety.

FIELD OF THE INVENTION

The present invention is directed to an amine curable elastomer composition, a process for producing a thermoset acrylate elastomer composition having enhanced heat-aging performance, and to articles formed from the thermoset elastomer composition.

BACKGROUND OF THE INVENTION

Polyacrylate elastomers are well-known synthetic rubbers formed by polymerization of alkyl acrylates. The polyacrylate elastomers may be polyacrylates that contain only copolymerized alkyl acrylate units, for example copolymerized units of methyl acrylate and butyl acrylate. Alternatively, they may be alkyl acrylate copolymers that contain additional copolymerized monomers, such as ethylene, and cure site monomers such as chlorovinyl ether, monomers that contain carboxyl groups, and/or epoxide containing monomers. The raw polymers, also known as gums or gum rubbers, may be cured with a wide variety of curatives, depending on the cure site monomers. Some acrylate elastomers may be cured with metal soaps such as sodium or potassium stearate, in combination with sulfur, a sulfur donor, a tertiary amine, or a quaternary amine salt. Epoxides, isocyanates, and polyols may also be used in certain cases. Polyamines, specifically diamines, are effective curatives for polyacrylates comprising amine-reactive cure sites. Of these curatives, diamines or diamine generators are often preferred because the cured polymers produced exhibit enhanced heat aging resistance. Therefore, diamine curable acrylate elastomers are sometimes referred to as "High Temperature" acrylate elastomers. Examples of commercially available acrylate elastomers include Vamac® ethylene acrylic elastomers manufactured by E. I. du Pont de Nemours and Company, HyTemp® elastomers, manufactured by Zeon Chemicals L.P, and Noxtite® ACM acrylic rubber available from Unimatec Co., Ltd.

In view of their excellent oil resistance, polyacrylate elastomers are widely used in the manufacture of automotive parts, such as automotive boots, ignition cable jacketing and hoses.

Resistance to heat aging is a particularly desirable property in rubber parts that are used in under the hood automotive applications, e.g. hoses, gaskets, and seals. Because such parts may be exposed to temperatures in excess of 180° C. for periods of several hours on a regular basis, degradation of physical properties through oxidative embrittlement can occur. In acrylate rubbers, a reduction in extensibility and an increase in hardness and modulus of the acrylate rubber article often result. Such effects are disclosed for example in Zeon Chemicals L.P., HyTemp® Technical Manual, Rev. 2009-1, p. 59-61 (2009). Methods to enhance heat age resistance of polyacrylate rubbers have involved attempts to increase the oxidative stability of the polymer by manipulation of the monomer types that comprise the copolymerized units in the polymer backbone including the monomer ratio.

In theory, such alterations can provide modified polymer architectures that exhibit increased stability. More effective antioxidants have also been sought. However, there is still a need to improve the high temperature resistance of acrylate elastomers.

Although it is known that the presence of fillers can have an adverse effect on high temperature stability of acrylate elastomers, the presence of fillers in elastomer formulations (also referred to in the art as elastomer compounds) is generally necessary for reinforcement and development of certain physical properties such as tensile strength and modulus in cured (i.e. crosslinked) compositions and articles comprising the cured compositions. Carbon black is the most widely used filler due to its excellent reinforcement properties and low cost. Other examples of fillers that are commonly used in acrylate elastomers include hydrated alumina, calcium carbonate, barium sulfate, titanium dioxide, magnesium silicate, kaolin clay, and silica. All these fillers adversely affect heat aging of cured acrylate elastomer compositions and articles.

It has been postulated that fillers accelerate heat aging of polyacrylate elastomers by facilitating transport of oxygen to the polymer-filler interface. This leads to an increased rate of formation of free radicals at such locations through oxidative reactions. The free radicals generated in this manner promote crosslinking reactions, thereby resulting in eventual embrittlement of the elastomer. Reinforcing grades of carbon black such as N330 and N550 are particularly effective at facilitating transport of oxygen because they contain pores that may transport air. However, even non-porous fillers create interfacial regions between the solid filler particles and the elastomer. Few polymer chains reside in such interfacial regions and consequently diffusion of air may be enhanced. Thus, exposure of the elastomer to air is believed to be greater in filled polyacrylate elastomers compared to polyacrylate elastomers that are free of filler.

As the reinforcing power of a filler increases, e.g., the ability of the filler to increase Shore A hardness of a cured acrylate elastomer composition, the tendency of that filler to lower resistance of the acrylate elastomer to the deleterious effects of hot air aging also increases. Such effects are disclosed for a range of carbon black types by Unimatec Chemicals Germany in a publication entitled Noxtite ACM (basic), January 2007, pp. 56-57. It would be desirable to have available an alternative filler that permits the attainment of good elastic properties such as compression set resistance and tensile elongation to break in the cured, filled elastomer and further provides the advantages of filler reinforcement (i.e. high tensile strength, modulus and Shore A hardness), but does not promote oxidative degradation at high temperatures (i.e. 160° C. or greater).

It has now been found that it is possible to produce cured acrylate elastomer compositions of high hardness, strength, and elasticity, that exhibit excellent heat aging resistance through use of polyamide as a filler.

A number of acrylate rubber-polyamide blend compositions have been disclosed in the prior art. For example, it is known to add uncured acrylate elastomers (i.e. gums) to polyamides to form toughened thermoplastic compositions. U.S. Pat. No. 4,174,358 discloses the use of various uncured acrylate elastomers or ethylene based thermoplastic resins comprising up to 95 mole percent ethylene, such as ethylene/methyl acrylate/monoethyl maleate/ethylene dimethacrylate tetrapolymers or ionomers of ethylene/methyl acrylate/monoethyl maleate terpolymers, as toughening additives for polyamides. The polyamide component in such compositions comprises the continuous polymer matrix and the uncured acrylate elastomer is a minor additive. U.S. Pat. No. 5,070, 145 discloses thermoplastic blends of polyamides with ethylene copolymers comprising copolymerized units of dicarboxylic acid anhydrides and optionally alkyl (meth)acrylates. U.S. Pat. No. 7,544,757 discloses that blends of ethylene-alkyl acrylate polymers may be blended at levels up to 30% by weight in polyamide to produce toughened polyamide compositions.

Blends of uncured ethylene acrylic elastomers, polyamides and powdered metals are disclosed in Japanese Patent 2001-1191387.

U.S. Pat. No. 3,965,055 discloses vulcanizates prepared from a blend of rubber and 2 wt. % to 10 wt. % of a crystalline fiber-forming thermoplastic, wherein the thermoplastic is dispersed in the rubber component in particles not greater than 0.5 micron in cross section with a length to diameter ratio greater than 2. The high aspect ratio of the thermoplastic particles enables pressureless curing without void formation.

Japanese Patent Application Publication H10-251452 discloses a dispersion of polyamide particles in a hydrogenated nitrile rubber (HNBR) matrix wherein a compatibilizing polymer that may be an ethylene copolymer or an acrylate elastomer is also present. The compatibilizing polymer is ionically crosslinked by metal oxide during mixing with the HNBR and polyamide which prevents the acrylate elastomer from forming a continuous phase. The HNBR component is then cured with a peroxide or with sulfur.

U.S. Pat. No. 6,133,375 discloses blends of functionalized rubbers with thermoplastics in which the thermoplastic component is dispersed in the rubber phase. Following addition of a curative for the rubber, the composition is crosslinked to produce a vulcanized article. Examples of functionalized rubbers which are disclosed include acrylic rubbers such as nitrile-butadiene rubber, hydrogenated nitrile-butadiene rubber, epichlorohydrin rubber, and rubbers on which reactive groups have been grafted, such as carboxylated nitrile-butadiene rubber. Thermoplastics that are disclosed include polyetherester block copolymers, polyurethanes, polyamides, polyamide ether or ester block copolymers, and mixtures of polyamides and polyolefins. In the latter case, ethylene-alkyl acrylate copolymers comprising grafted or co-polymerized maleic anhydride, glycidyl methacrylate, or (meth)acrylic acid units may be used to compatibilize the polyamide-polyolefin blend.

U.S. Pat. No. 4,694,042 discloses an elastomeric thermoplastic molding material containing a coherent phase of polyamide and crosslinked elastomeric polyacrylate core shell polymers.

U.S. Pat. No. 4,275,180 discloses blends of thermoplastic polymers with acrylate rubbers, the blends being crosslinked or crosslinkable by radiation or peroxide. Fillers may be used in amounts of up to 40% by weight of the composition.

U.S. Patent Application 2006/0004147 discloses blends of elastomers, for example acrylate elastomers, with thermoplastic polymers such as polyamides, in which both polymers are coupled and crosslinked by free radicals, e.g., by electron beam radiation. The compositions may comprise a continuous phase of thermoplastic with dispersed crosslinked elastomer particles, or a continuous crosslinked elastomer phase with dispersed crosslinked particles of what was initially thermoplastic.

U.S. Pat. No. 8,142,316 discloses cured blends of elastomers and thermoplastics for use in power transmission belts. The elastomer may be an ethylene acrylic elastomer, and the thermoplastic may be a polyamide. Free radical curatives are disclosed as curing agents.

It is also known to form dynamically cured thermoplastic compositions having a polyamide matrix continuous phase and a cured acrylate rubber phase that is present in the form of discrete particles. Thermoplastic elastomeric compositions comprising blends of polyamide and ionically crosslinked ethylene acrylic rubber are disclosed in U.S. Pat. No. 4,310,638. U.S. Pat. Nos. 5,591,798 and 5,777,033 disclose thermoplastic elastomer compositions comprising a blend of polyamide resins and covalently-crosslinked acrylate rubber.

U.S. Pat. No. 7,608,216 and U.S. Patent Application Publication 2006/0100368 disclose compositions prepared by admixing an uncured thermoset elastomer, for example an acrylate elastomer, with a thermoplastic polymer or another uncured (gum) elastomer. Techniques such as fractional curing, partial dynamic vulcanization, or the use of high performance reinforcing fillers are disclosed to increase the green strength of the uncured or partially cured compound. The admixed compositions may be subsequently crosslinked with a curing agent for the elastomer component.

Polyacrylate rubber-polyamide blend compositions disclosed in Zeon Chemicals L.P., HyTemp® Technical Manual, Rev. 2009-1, p. 46 (2009) are said to improve impact strength of plastics. They may also be used to produce thermoplastic elastomers.

It has now been surprisingly found that when a dispersion of polyamide particles replaces all or a significant portion of a conventional particulate reinforcing agent in a continuous polyacrylate elastomer matrix, the resultant compositions, when cured with an amine curative system, exhibit enhanced resistance to physical property loss during heat aging. In addition, such compositions maintain excellent tensile strength, modulus, hardness, and elastic properties such as compression set and elongation at break that characterize compositions containing conventional reinforcing fillers.

SUMMARY OF THE INVENTION

The present invention is directed to a polyimide-filled acrylate copolymer composition comprising A. a polymer blend composition comprising 1. 40 to 90 wt. % of one or more amorphous acrylate copolymers comprising
   a) at least 50 wt. %, based on the total weight of the amorphous acrylate copolymer, of polymerized units of at least one monomer having the structure

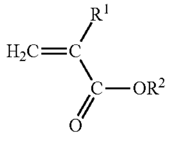

Where $R^1$ is H or $C_1$-$C_{10}$ alkyl and $R^2$ is $C_1$-$C_{12}$ alkyl, $C_1$-$C_{20}$ alkoxyalkyl, $C_1$-$C_{12}$ cyanoalkyl, or $C_1$-$C_{12}$ fluoroalkyl, and
   b) 0.3 mole percent-1.0 mole percent copolymerized units of a cure site monomer selected from the group consisting of unsaturated carboxylic acids, anhydrides of unsaturated carboxylic acids, unsaturated epoxides, and mixtures of two or more thereof; and B. 10-60 wt. % of one or more polyamides having a melting peak temperature of at least 160° C.;

wherein i) the polymer blend has a green strength of less than about 2 MPa as determined according to ASTM D6746-10, ii) the one or more polyamides are present as a discontinuous phase in the polymer blend composition, and iii) the weight percentages of the one or more amorphous acrylate copolymers and one or more polyamides are based on the combined weight of the oneor more amorphous acrylate copolymers and one or more polyamides in the polymer blend composition.

The present invention is also directed to a curable polyamide-filled acrylate copolymer composition comprising A. a polymer blend composition comprising 1. 40 to 90 wt. % of one or more amorphous acrylate copolymers comprising a) at least 50 wt. %, based on the total weight of the amorphous acrylate copolymer, of polymerized units of at least one monomer having the structure

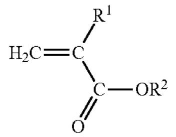

Where $R^1$ is H or $C_1$-$C_{10}$ alkyl and $R^2$ is $C_1$-$C_{12}$ alkyl, $C_1$-$C_{20}$ alkoxyalkyl, $C_1$-$C_{12}$ cyanoalkyl, or $C_1$-$C_{12}$ fluoroalkyl, and b) copolymerized units of a cure site monomer selected from the group consisting of unsaturated carboxylic acids, anhydrides of unsaturated carboxylic acids, unsaturated epoxides, and mixtures of two or more thereof; and 2. 10-60 wt. % of one or more polyamides having a melting peak temperature of at least 160° C.;

wherein the green strength of the polymer blend composition is less than about 2 MPa, as determined in accordance with ASTM D6746-10, and iii) the weight percentages of the one or more amorphous acrylate copolymers and one or more polyamides are based on the combined weight of the amorphous one or more acrylate copolymers and one or more polyamides in the polymer blend composition; and B. an amine curative.

The invention is also directed to a process for production of a polyimide-filled acrylate copolymer composition, the process comprising the steps A. providing a polymer blend composition comprising 1. 40 to 90 wt. % of one or more amorphous acrylate copolymers comprising a) at least 50 wt. %, based on the total weight of the amorphous acrylate copolymer, of polymerized units of at least one monomer having the structure

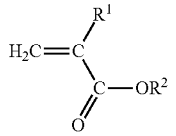

Where $R^1$ is H or $C_1$-$C_{10}$ alkyl and $R^2$ is $C_{10}$-$C_{12}$ alkyl, $C_1$-$C_{20}$ alkoxyalkyl, $C_{10}$-$C_{12}$ cyanoalkyl, or $C_{10}$-$C_{12}$ fluoroalkyl; and b) copolymerized units of a cure site monomer selected from the group consisting of unsaturated carboxylic acids, anhydrides of unsaturated carboxylic acids, unsaturated epoxides, and mixtures of two or more thereof; and 2. 10-60 wt. % of one or more polyamides having melting peak temperatures of at least 160° C.;

wherein i) the one or more polyamides are present as a discontinuous phase in the polymer blend composition and ii) the weight percentages of the one or more amorphous acrylate copolymers and one or more polyamides are based on the combined weight of the one or more amorphous acrylate copolymers and one or more polyamides in the polymer blend composition;

B. mixing the polymer blend composition at a temperature above the melting peak temperatures of the one or more polyamides to disperse the one or more polyamides within the one or more amorphous acrylate copolymers, thereby forming a polyamide-filled acrylate copolymer composition; and C. cooling the polyamide-filled acrylate copolymer composition to a temperature below the crystallization peak temperatures of the one or more polyamides, thereby forming a polyamide-filled acrylate copolymer composition that i) comprises a continuous amorphous acrylate copolymer phase and a discontinuous polyamide phase and ii) has a green strength of less than about 2 MPa as determined according to ASTM D 6746-10.

The invention is also directed to a process for preparing a curable polyamide-filled acrylate copolymer composition which comprises the steps of providing a polyamide-filled acrylate copolymer composition prepared by the above-described process and adding an amine curative to the polyamide-filled acrylate copolymer composition.

The invention is further directed to a process for preparing an acrylate copolymer elastomer composition comprising the steps of A. providing a polyamide-filled acrylate copolymer composition that has been prepared by a process comprising the steps 1. providing a polymer blend composition comprising a. 40-90 wt. % of one or more amorphous acrylate copolymers comprising i) at least 50 wt. %, based on the total weight of the copolymer, of copolymerized units of a monomer having the structure

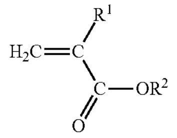

Where $R^1$ is H or $C_1$-$C_{10}$ alkyl and $R^2$ is $C_1$-$C_{12}$ alkyl, $C_1$-$C_{20}$ alkoxyalkyl, $C_1$-$C_{12}$ cyanoalkyl, or $C_1$-$C_{12}$ fluoroalkyl, and ii) copolymerized units of a cure site monomer selected from the group consisting of unsaturated carboxylic acids, anhydrides of unsaturated carboxylic acids, unsaturated epoxides, and mixtures of two or more thereof; and b. 10-60 wt. % of one or more polyamides having a melting peak temperature of at least 160° C., wherein the weight percentages of the one or more amorphous acrylate copolymers and one or more polyamides are based on the combined weight of the one or more amorphous acrylate copolymers and one or more polyamides in the polymer blend;

2. mixing the polymer blend composition at a temperature above the melting peak temperature of the one or more polyamides to disperse the one or more polyamides within the one or more acrylate copolymers, thereby forming a polyamide-filled acrylate copolymer composition; and 3. cooling the polyamide-filled acrylate copolymer composition to a temperature below the crystallization peak temperatures of the one or more polyamides, thereby forming a polyamide-filled acrylate copolymer composition that i) comprises a continuous acrylate copolymer elastomer phase and a discontinuous polyamide phase and ii) has a green strength of less than about 2 MPa as determined according to ASTM D 6746-10;

B. adding an amine curative to the cooled polyamide-filled acrylate copolymer composition to form a curable polyamide-filled acrylate copolymer composition; and C. curing the curable polyamide-filled acrylate copolymer composition by exposing the curable polyamide-filled acrylate copolymer composition to a temperature of about 160° C. to about 200° C. for about 2 to 60 minutes to form a crosslinked acrylate copolymer elastomer composition, and optionally exposing said crosslinked composition to post-cure heating at a temperature of about 160° C. to about 200° C., thereby forming an acrylate copolymer elastomer composition having a Shore A hardness of at least 40, as determined according to ASTM D 2240-06 (1 second reading).

The invention is further directed to a curable acrylate copolymer composition consisting essentially of A. a polymer blend composition comprising 1. 40 to 90 wt. % of one or more amorphous acrylate copolymers comprising a) at least 50 wt. %, based on the total weight of the amorphous acrylate copolymer, of polymerized units of at least one monomer having the structure

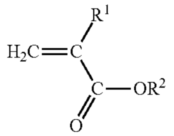

Where $R^1$ is H or $C_1$-$C_{10}$ alkyl and $R^2$ is $C_1$-$C_{12}$ alkyl, $C_1$-$C_{20}$ alkoxyalkyl, $C_1$-$C_{12}$ cyanoalkyl, or $C_1$-$C_{12}$ fluoroalkyl, and b) copolymerized units of a cure site monomer selected from the group consisting of unsaturated carboxylic acids, anhydrides of unsaturated carboxylic acids, unsaturated epoxides, and mixtures of two or more thereof; and 2. 10-60 wt. % of one or more polyamides having a melting peak temperature of at least 160° C.;

wherein i) the one or more polyamides are present as a discontinuous phase in the polymer blend composition, ii) the weight percentages of the one or more amorphous acrylate copolymers and one or more polyamides are based on the combined weight of the one or more amorphous acrylate copolymers and one or more polyamides in the polymer blend composition and iii) the polymer blend composition has a green strength less than about 2 MPa;

B. an amine curative; and

C. a reinforcing filler, the reinforcing filler being present in the curable acrylate copolymer composition in an amount that causes an increase in the Shore A hardness of the cured acrylate copolymer composition of no more than about 20 points as compared to the Shore A hardness of a control composition that is of identical composition but for the absence of the reinforcing filler, wherein i) the curable acrylate copolymer composition and control composition are formed into test specimens of 1 mm to 2.5 mm thickness, the test specimens are cured by exposure to a temperature of 175° C. for 10 minutes in a closed mold at a pressure of at least 10 MPa, demolded and the test specimens are subjected to a post cure at a temperature of 175° C. for 4 hours in a hot air oven to form post cured test specimens, ii) Shore A hardness of the post cured acrylate copolymer composition and the post cured control composition is determined according to ASTM D 2240-06 (1 second reading), and iii) the post cured acrylate copolymer composition has a Shore A hardness greater than 40.

DETAILED DESCRIPTION OF THE INVENTION

The present invention is directed to compositions comprising blends of acrylate copolymers and polyamides that, when cured with an amine curative system, exhibit enhanced resistance to physical property loss during heat aging. The invention is also directed to a process for preparation of the acrylate copolymer/polyamide blend compositions, a process for preparation of curable acrylate copolymer/polyamide blend compositions and a process for preparation of elastomers from the curable acrylate copolymer/polyamide blend compositions.

It has been found that when polyamide particles largely replace carbon black and conventional reinforcing inorganic fillers in curable amorphous acrylate copolymers (also known as acrylate copolymer gum rubbers) such that the acrylate copolymer forms a continuous phase and the polyamide forms a discontinuous phase, the resultant compositions, when cured, exhibit surprising improvements in physical properties. That is, the curing process, which is also commonly referred to as crosslinking or vulcanization, converts the polyamide-filled acrylate copolymer composition to an acrylate copolymer elastomer composition that exhibits enhanced heat aging resistance compared to acrylate copolymer elastomers that comprise carbon black or other reinforcing fillers.

The term "reinforcement" refers to an increase in the hardness and tensile strength of the cured (i.e. crosslinked) composition, relative to the similarly crosslinked but unfilled acrylate copolymer gum rubber. In particular, a crosslinked acrylate copolymer elastomer composition having a Shore A hardness (ASTM D2240-06, 1 second reading) less than 40 is too soft for a large majority of acrylate copolymer elastomer applications, and therefore may be considered insufficiently reinforced. A crosslinked acrylate copolymer composition having a tensile strength of less than 4 MPa (ASTM D412-06, die C) is too weak for a large majority of acrylate copolymer applications, and therefore may be considered to be insufficiently reinforced.

One embodiment of the invention is a curable acrylate copolymer composition that comprises a polymer blend composition and an amine curative. The polymer blend composition is characterized by having a green strength of less than about 2 MPa as determined in accordance with ASTM D6746-10.

The polymer blend composition comprises two polymers, an acrylate copolymer and a polyamide. The polymer blend is referred to herein as a polyamide-filled acrylate copolymer. The acrylate copolymer component of the curable polyamide-filled acrylate copolymer compositions of the invention comprises one or more amorphous acrylate copolymers. The term amorphous as used herein with reference to an acrylate copolymer means a copolymer which exhibits little or no crystalline structure at room temperature in the unstressed state. By amorphous is meant that the acrylate copolymer has a heat of fusion of less than 4 J/g as determined according to ASTM D3418-08. The term "copolymer" as used herein refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene, methyl acrylate and 3 weight % of the monoethyl ester of maleic acid", or a similar description. Such a description may be considered informal in that it does not refer to the comonomers as copolymerized units; in that it does not include conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when noted) of the stated comonomers. It follows as a corollary that a copolymer is not the product of a reaction mixture containing given comonomers in specific amounts, unless expressly stated in limited circumstances to be such.

The amorphous acrylate copolymers useful in the practice of the invention described herein comprise copolymerized units of a) at least one alkyl ester and/or alkoxyalkyl ester of propenoic acid and b) a cure site monomer. Examples of such suitable alkyl and alkoxyalkyl esters of propenoic acid include alkyl acrylates and alkoxyalkyl acrylates as well as species wherein the propenoic acid is substituted with a $C_1$-$C_{10}$ alkyl group. Examples of such species include alkyl methacrylates, alkyl ethacrylates, alkyl propacrylates, and alkyl hexacrylates, alkoxyalkyl methacrylates, alkoxyalkyl ethacryates, alkoxyalkyl propacrylates and alkoxyalkyl hexacrylates. In addition, the alkyl ester groups of the propenoic acid esters may be substituted with cyano groups or one or more fluorine atoms. That is, the ester group will be a $C_1$-$C_{12}$ cyanoalkyl group or a $C_1$-$C_{12}$ fluoroalkyl group. The acrylate copolymers may also comprise copolymerized units of more than one species of the alkyl esters and/or alkoxyalkyl esters, for example two alkyl acrylates.

The alkyl and alkoxyalkyl esters of propenoic acid and substituted propenoic acids are preferably $C_{10}$-$C_{12}$ alkyl esters of acrylic or methacrylic acid or $C_1$-$C_{20}$ alkoxyalkyl esters of acrylic or methacrylic acid. Examples of such esters include methyl acrylate, methyl methacrylate, ethyl acrylate, ethyl methacrylate, butyl acrylate, butyl methacrylate, 2-ethylhexyl acrylate, 2-methoxyethylacrylate, 2-ethoxyethylacrylate, 2-(n-propoxy)ethylacrylate, 2-(n-butoxy)ethylacylate, 3-methoxypropylacrylate and 3-ethoxypropylacrylate. Examples of esters that contain $C_{10}$-$C_{12}$ cyanoalkyl and fluoroalkyl groups include cyanomethylacrylate, 1-cyanoethylacrylate, 2-cyanopropylacrylate, 3-cyanopropylacrylate, 4-cyanobutylacrylate, 1,1-dihydroperfluoroethyl methacrylate, 1,1-dihydroperfluoroethyl acrylate, 1,1-dihydroperfluoropropyl methacrylate, 1,1-dihydroperfluoropropyl acrylate, and 1,1,5-trihydroperfluorohexyl (meth)acrylate, and 1,1,5-trihydroperfluorohexyl methacrylate. Preferably, the ester group will comprise $C_1$-$C_8$ alkyl groups. More preferably, the ester group will comprise $C_1$-$C_4$ alkyl groups. Particularly useful alkyl acrylate esters are methyl acrylate, ethyl acrylate and butyl acrylate. Particularly useful alkyl methacrylate esters are methyl methacrylate. Minor amounts of unsaturated acetates such as ethenyl acetate or 3-butenyl acetate may be incorporated into the polymer without deviating from the scope of this invention. By minor amounts is meant less than 1 wt. %, based on the weight of the acrylate copolymer.

Esters that comprise comonomer units in the acrylate copolymers may be generally represented by the formula

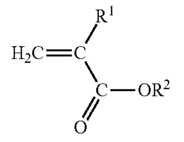

Where $R^1$ is H or $C_1$-$C_{10}$ alkyl, and $R^2$ is $C_1$-$C_{12}$ alkyl, $C_1$-$C_{20}$ alkoxyalkyl, $C_1$-$C_{12}$ cyanoalkyl, or $C_1$-$C_{12}$ fluoroalkyl.

In certain embodiments, the acrylate copolymers may be derived from copolymerization of more than one acrylate monomer, for example a first alkyl acrylate, a second alkyl acrylate and optionally, a monoalkyl ester of 1,4-butenedioic acid. Examples of such compositions include copolymers of methyl acrylate and butyl acrylate and copolymers of methyl acrylate, butyl acrylate and the monoethyl ester of 1,4-butenedioic acid.

The concentration of propenoic acid ester comonomers that are present in these acrylate copolymers will be at least 50 weight percent, based on the weight of the copolymer. Preferably, the concentration will be at least 55 weight percent, and more preferably at least 60 weight percent. If the concentration of propenoic acid ester is below 50 wt. %, the likelihood that some crystallinity will be present is high, for example in polymers that are ethylene acrylate ester copolymers. Crystallinity in the acrylate copolymer diminishes the elastic properties of the cured composition. In addition, a high content of non-polar monomer, such as ethylene, diminishes compatibility of the acrylate copolymer with polyamide, and therefore physical properties of the cured composition, such as tensile and tear strength, will be affected.

The acrylate copolymers useful in the practice of the invention comprise copolymerized cure site monomer units selected from the group consisting of unsaturated carboxylic acids, anhydrides of unsaturated carboxylic acids, unsaturated epoxides, and mixtures of two or more thereof. These cure site monomer units contain chemical groups (e.g., carboxyl and epoxy groups) that react with amines and/or other nitrogen-containing species, such as carbamates.

Unsaturated carboxylic acids include for example, acrylic acid and methacrylic acid, 1,4-butenedioic acids, citraconic acid, and monoalkyl esters of 1,4-butenedioic acids. The 1,4-butenedioic acids may exist in cis- or trans-form or both, i.e. maleic acid or fumaric acid, prior to polymerization. Useful copolymerizable cure site monomers also include anhydrides of unsaturated carboxylic acids, for example, maleic anhydride, citraconic anhydride, and itaconic anhydride. Preferred cure site monomers include maleic acid and any of its half acid esters (monoesters) or diesters, particularly the methyl or ethyl half acid esters (e.g., monoethyl maleate); fumaric acid and any of its half acid esters or diesters, particularly the methyl, ethyl or butyl half acid esters; and monoalkyl and monoarylalkyl esters of itaconic acid. The presence of these copolymerized cure site monomers produces curable acrylate copolymer compositions that exhibit good scorch safety, meaning that the cure site reacts with amines slowly or not at all at temperatures less than about 120° C., but still permits fast crosslinking at higher temperatures.

Examples of useful unsaturated epoxides include for example, glycidyl (meth)acrylate, allyl glycidyl ether, glycidyl vinyl ether, and alicyclic epoxy-containing (meth)acrylates.

Preferably, the acrylate copolymer gum rubber comprises at least 0.3 mol % of cure site monomer units bearing the amine reactive group, based on the total number of moles of monomer in the copolymer, more preferably at least 0.4 mol %, and most preferably more than 0.5 mol %. While the cure site level in the acrylate copolymer must be sufficient to produce a crosslinked network during the curing and post curing process, high levels of cure site monomer tend to negatively affect heat aging properties of the cured compositions of the invention. Preferably, the acrylate copolymer comprises less than 1.4 mol % cure site, more preferably less than 1.2 mol %, and most preferably less than 1.0 mol %. A preferred range for many embodiments is 0.3 mol %-1.0 mol % cure site monomer units. When two or more acrylate copolymers are present in the acrylate copolymer component of the polyamide-filled compositions of the invention, the range of about 0.3 to 1.0 mol % amine reactive cure sites applies to the weight average of mole percent cure site in the individual acrylate copolymers. This applies to the other mol % ranges of cure site monomer when more than one acrylate copolymer is present.

In many embodiments, the acrylate copolymers useful in the practice of the invention will also comprise copolymerized units of additional comonomers, for example ethylene and/or other olefins such as propylene, 1-butene, 1-hexene, 1-octene, and the like. The olefin will be present at a concentration of less than 50 wt. %, more preferably less than 45 wt. %, and most preferably about 40 wt. % or less, based on the weight of the acrylate copolymer. Ethylene alkyl acrylate copolymer rubbers having amine-vulcanizable groups are particularly suitable acrylate copolymers for use in the compositions and processes described herein. An example of such a rubber is Vamac® ethylene acrylic elastomer, available from E. I. du Pont de Nemours and Company.

The acrylate copolymers useful in the practice of the invention are curable, i.e. crosslinkable, due to the presence in the polymer chain backbone of copolymerized monomer units that contain epoxy, carboxylic acid, carboxylic acid anhydride and/or carboxylic ester moieties. Such chemical groups can take part in thermally-induced chemical reactions in the presence of aromatic or aliphatic polyamines, preferably diamines.

The amorphous acrylate copolymers that are used to prepare the curable polyamide-filled acrylate copolymer compositions of the invention are curable gums, i.e. they are substantially uncured rubbers, and retain reactivity towards crosslinking, generally by amines and certain other nitrogen-containing reactants after blending with the polyamide. By substantially uncured is meant that the unblended amorphous acrylate copolymer has a sufficiently low viscosity to be shaped into a finished article by molding or extrusion. Preferably, the Mooney viscosity (ASTM D1646, ML 1+4 at 100° C.) of the acrylate copolymer is less than 120, more preferably less than 80 and most preferably less than 40. By retaining reactivity towards crosslinking is meant that the curable composition intended for production of a molded or extruded article (i.e. the composition that includes acrylate copolymer, polyamide, curative and optionally conventional filler) exhibits an increase in torque (MH-ML) when tested in a rotorless cure meter per ASTM D5289-07a at conditions of 177° C. for 24 minutes=of at least 2.5 dN-m, more preferably at least 4 dN-m, and most preferably more than 5.5 dN-m. The acrylate copolymers are amorphous polymers, rather than crystalline thermoplastics. That is, the heat of fusion of the acrylate copolymer will generally be less than 4 J/g as measured by ASTM D3418-08, preferably less than 2 J/g, and most preferably about 0 J/g.

Acrylate copolymers of this type may be prepared for example according to the procedures described in U.S. Pat. Nos. 3,904,588; 4,520,183; 6,156,849, and 7,402,631.

The polymer blend composition that comprises one component of the curable acrylate copolymer compositions described herein comprises one or more polyamides having a melting peak temperature of at least about 160° C., preferably less than 270° C. as determined in accordance with ASTM D3418-08. Preferably the polyamide is solid at the curing temperature of the acrylate elastomer, meaning that the curing temperature is less than the melting peak temperature. While not wishing to be bound by theory, when the polyamide is not solid at the curing temperature, curative readily diffuses into the polyamide, rendering the blend difficult to cure. Polyamide resins are well known in the art and embrace those semi-crystalline resins having a weight average molecular weight of at least 5,000 and include those compositions commonly referred to as nylons. Thus, the polyamide component useful in the practice of the invention includes polyamides and polyamide resins such as nylon 6, nylon 7, nylon 6/6, nylon 6/10, nylon 6/12, nylon 11, nylon 12, polyamides comprising aromatic monomers, and polyamide block copolymers such as copoly(amide-ether) or copoly(amide-ester). The resins may be in any physical form, such as pellets and particles of any shape or size, including nanoparticles.

The viscosity of the polyamide resins can vary widely while meeting the aims of the present invention. To ensure that the polyamide becomes dispersed within a continuous phase of acrylate elastomer, it is desirable that the polyamide have an inherent viscosity greater than 0.9 dL/g, more preferably greater than 1.1 dL/g, and most preferably greater than 1.3 dL/g, as measured in accordance with ASTM D2857-95, using 96% by weight sulfuric acid as a solvent at a test temperature of 25° C.

In general, as the concentration of the polyamide in the acrylate copolymer blend increases, the use of a polyamide of higher inherent viscosity becomes more desirable. In certain embodiments, a polyamide with a high content of amine end groups, about 60 meq/Kg or greater, can be desirable and permits the use of a low viscosity polyamide of inherent viscosity about 0.89 dL/g. Such a high amine end group content results in a grafting reaction between the cure site of the acrylate rubber and the polyamide amine end groups which can help to disperse the polyamide in the acrylate rubber. In some instances, however, use of such high amine content polyamide can result in gelling of the acrylate rubber during melt mixing with the polyamide, making subsequent processing more difficult. Gelling of the acrylate elastomer becomes more problematic as the concentration of polyamide in the acrylate copolymer increases.

The polyamide resin can be produced by condensation polymerization of equimolar amounts of a saturated dicarboxylic acid containing from 4 to 12 carbon atoms with a diamine, in which the diamine contains from 4 to 14 carbon atoms. To promote adhesion between the acrylate rubber and the nylon, preferably the polyamide will contain some amine end groups. Polyamide types polymerized from diacids and diamines may contain some molecules having two amine groups. In such cases, certain combinations of polyamide and acrylate rubber can crosslink or gel slightly so as to produce compositions with compromised extrusion processability. Polyamide types prepared by ring opening polymerization reactions such as nylon 6, or those based solely on aminocarboxylic acids such as nylon 7 or 11 are most preferred because they avoid the possibility of crosslinking during blending with the acrylate rubber. Such polyamide types contain molecules with at most one amine group each.

Examples of polyamides include polyhexamethylene adipamide (66 nylon), polyhexamethylene azelaamide (69 nylon), polyhexamethylene sebacamide (610 nylon) and polyhexamethylene dodecanoamide (612 nylon), the polyamide produced by ring opening of lactams, i.e. polycaprolactam, polylauriclactam, poly-11-aminoundecanoic acid, and bis(p-aminocyclohexyl)methanedodecanoamide. It is also possible to use polyamides prepared by the copolymerization of two of the above polymers or terpolymerization of the above polymers or their components, e.g. an adipic acid isophthalic acid hexamethylene diamine copolymer.

Typically, polyamides are condensation products of one or more dicarboxylic acids and one or more diamines, and/or one or more aminocarboxylic acids, and/or ring-opening polymerization products of one or more cyclic lactams. Polyamides may be fully aliphatic or semi-aromatic.

Fully aliphatic polyamides useful in practice of the present invention are formed from aliphatic and alicyclic monomers such as diamines, dicarboxylic acids, lactams, aminocarboxylic acids, and their reactive equivalents. A suitable aminocarboxylic acid is 11-aminododecanoic acid. Suitable lactams are caprolactam and laurolactam. In the context of this invention, the term "fully aliphatic polyamide" also refers to copolymers derived from two or more such monomers and blends of two or more fully aliphatic polyamides. Linear, branched, and cyclic monomers may be used.

Carboxylic acid monomers comprised in the fully aliphatic polyamides include, but are not limited to aliphatic carboxylic acids, such as for example adipic acid, pimelic acid, suberic acid, azelaic acid, decanedioic acid, dodecanedioic acid, tridecanedioic acid, tetradecanedioic acid, and pentadecanedioic acid. Diamines can be chosen from diamines having four or more carbon atoms, including, but not limited to tetramethylene diamine, hexamethylene diamine, octamethylene diamine, decamethylene diamine, dodecamethylene diamine, 2-methylpentamethylene diamine, 2-ethyltetramethylene diamine, 2-methyloctamethylenediamine; trimethylhexamethylenediamine, meta-xylylene diamine, and/or mixtures thereof.

Semi-aromatic polyamides are also suitable for use in the present invention. Such polyamides are homopolymers, dipolymers, terpolymers or higher order polymers formed from monomers containing aromatic groups. One or more aromatic carboxylic acids may be terephthalic acid or a mixture of terephthalic acid with one or more other carboxylic acids, such as isophthalic acid, phthalic acid, 2-methyl terephthalic acid and naphthalic acid. In addition, the one or more aromatic carboxylic acids may be mixed with one or more aliphatic dicarboxylic acids. Alternatively, an aromatic diamine such as meta-xylylene diamine can be used to provide a semi-aromatic polyamide, an example of which is a homopolymer comprising meta-xylylene diamine and adipic acid.

Block copoly(amide) copolymers are also suitable for use as the polyamide component provided the melting peak temperature of the polyamide block is at least 160° C. If a low softening point material comprises the block copoly(amide) copolymer, e.g., a polyether oligomer or a polyalkylene ether, for example, poly(ethylene oxide), then the block polymer will be a copoly(amide-ether). If a low softening point material of the block copoly(amide) copolymer comprises an ester, for example, a polylactone such as polycaprolactone, then the block copolymer will be a copoly(amide-ester). Any such low softening point materials may be used to form a block copoly(amide) copolymer. Optionally, the lower softening point material of the block copoly(amide) copolymer may comprise a mixture, for example, a mixture of any of the above-mentioned lower softening point materials. Furthermore, said mixtures of lower softening point materials may be present in a random or block arrangement, or as mixtures thereof. Preferably, the block copoly(amide) copolymer is a block copoly(amide-ester), a block copoly(amide-ether), or mixtures thereof. More preferably, the block copoly(amide) copolymer is at least one block copoly(amide-ether) or mixtures thereof. Suitable commercially available thermoplastic copoly(amide-ethers) include PEBAX® polyether block amides from Elf-Atochem, which includes PEBAX® 4033 and 6333. Most preferably, the polyamide is other than a block copoly(amide-ether) or copoly(amide-ester). Other polyamides have generally higher melting peak temperatures and are more effective in reinforcing the acrylate elastomer. Poly(amide-ethers) also exhibit poorer hot air aging as compared to conventional polyamides lacking a polyether block.

Preferred polyamides are homopolymers or copolymers wherein the term copolymer refers to polyamides that have two or more amide and/or diamide molecular repeat units.

The polyamide component may comprise one or more polyamides selected from Group I polyamides having a melting peak temperature of at least about 160° C., but less than about 210° C., and comprising an aliphatic or semiaromatic polyamide, for example poly(pentamethylene decanediamide), poly(pentamethylene dodecanediamide), poly(c-caprolactam/hexamethylene hexanediamide), poly(c-caprolactam/hexamethylene decanediamide), poly(12-aminododecanamide), poly(12-aminododecanamide/tetramethylene terephthalamide), and poly(dodecamethylene dodecanediamide); Group (II) polyamides having a melting peak temperature of at least about 210° C., and comprising an aliphatic polyamide selected from the group consisting of poly(tetramethylene hexanediamide), poly(c-caprolactam), poly(hexamethylene hexanediamide), poly(hexamethylene dodecanediamide), and poly(hexamethylene tetradecanediamide); Group (III) polyamides having a melting peak temperature of at least about 210° C., and comprising about 20 to about 35 mole percent semiaromatic repeat units derived from monomers selected from one or more of the group consisting of (i) aromatic dicarboxylic acids having 8 to 20 carbon atoms and aliphatic diamines having 4 to 20 carbon atoms; and about 65 to about 80 mole percent aliphatic repeat units derived from monomers selected from one or more of the group consisting of an aliphatic dicarboxylic acid having 6 to 20 carbon atoms and said aliphatic diamine having 4 to 20 carbon atoms; and a lactam and/or aminocarboxylic acid having 4 to 20 carbon atoms; Group (IV) polyamides comprising about 50 to about 95 mole percent semi-aromatic repeat units derived from monomers selected from one or more of the group consisting of aromatic dicarboxylic acids having 8 to 20 carbon atoms and aliphatic diamines having 4 to 20 carbon atoms; and about 5 to about 50 mole percent aliphatic repeat units derived from monomers selected from one or more of the group consisting of an aliphatic dicarboxylic acid having 6 to 20 carbon atoms and said aliphatic diamine having 4 to 20 carbon atoms; and a lactam and/or aminocarboxylic acid having 4 to 20 carbon atoms; Group (V) polyamides having a melting peak temperature of at least about 260° C., comprising greater than 95 mole percent semi-aromatic repeat units derived from monomers selected from one or more of the group consisting of aromatic dicarboxylic acids having 8 to 20 carbon atoms and aliphatic diamines having 4 to 20 carbon atoms; and less than 5 mole percent aliphatic repeat units derived from monomers selected from one or more of the group consisting of an aliphatic dicarboxylic acid having 6 to 20 carbon atoms and said aliphatic diamine having 4 to 20 carbon atoms; and a lactam and/or aminocarboxylic acid having 4 to 20 carbon atoms. The polyamide may also be a blend of two or more polyamides.

Preferred polyamides include nylon 6, 6/6, and Group IV polyamides having a melting peak temperature less than about 270° C. and an amine end group concentration of 60 meq or less. These polyamides have a melting peak temperature sufficiently high so as not to limit the scope of applications for the curable polyamide-filled acrylate copolymers, but not so high that production of the blends causes significant degradation of the acrylate copolymer. Also preferred are polyamides formed by ring opening or condensation of aminocarboxylic acids.

Polyamides suitable for use in the invention are widely commercially available, for example Zytel® resins, available from E. I. du Pont de Nemours and Company, Wilmington, Del., USA, Durethan® resins, available from Lanxess, Germany, and Ultramid® resins available from BASF, USA.

Preferably, the polyamide component of the filled acrylate copolymer compositions is present in the acrylate copolymer in the form of approximately spherical particles. The size of the particles is relatively unimportant, though tensile strength of the cured composition becomes optimal when most of the particles are about 1 micrometer in diameter or smaller. Such compositions can be mixed, molded and/or extruded using conventional techniques to produce curable compositions that may be crosslinked with conventional curative systems to form a wide variety of elastomer articles.

The polymer blend composition that is a component of the curable polyamide-filled acrylate copolymer compositions of the invention comprises 40-90 weight percent of the amorphous acrylate copolymer component described herein and 10-60 weight percent of the polyamide component described herein, based on the total weight of the acrylate copolymer and polyamide components. The amorphous acrylate copolymer component may be made up of one or more than one acrylate copolymer of the type described herein as being suitable for use in the practice of the invention. Similarly, the polyamide component may be made up of one or more than one polyamide of the type described herein as being suitable for use in the practice of the invention. Preferably, the curable compositions will comprise 50 to 80 weight percent acrylate copolymer component and 20 to 50 weight percent polyamide component, based on the total weight of the acrylate copolymer and polyamide components. More preferably, the curable compositions will comprise 55 to 70 weight percent acrylate copolymer component and 30 to 45 weight percent polyamide component based on the total weight of the acrylate copolymer and polyamide components. These ratios provide a polyamide-filled acrylate copolymer composition such that a cured article made therefrom exhibits sufficient Shore A hardness so that little or no reinforcing filler is needed to further increase the hardness of the cured composition. In addition, the polymer blends exhibit green strengths of less than about 2 MPa, as determined in accordance with ASTM D6746-10 and have good cure responses when compounded with a curative to form a curable composition, preferably at least 2.5 dN-m and more preferably at least 4 dN-m, as determined in accordance with ASTM D5289-07a using an MDR 2000 from Alpha Technologies operating at 0.5° arc and at test conditions of 177° C. for 24 minutes, where ML refers to the minimum torque value measured and MH refers to the maximum torque value attained after the measurement of ML.

The polymer blend component of the curable polyamide-filled acrylate copolymer compositions may be formed by mixing the polyamide component into the acrylate copolymer component at temperatures above the melting peak temperature of the polyamide, under conditions that do not produce a dynamic cure of the acrylate copolymer, followed by cooling the thus-produced polymer blend to form a polyamide-filled acrylate copolymer composition. That is, an amine curative will not be present when the polyamide component and acrylate copolymer component are being mixed. This is because the mixing temperature specified is above that at which crosslinking and/or gelling of the acrylate copolymer will occur.

Cooling of the composition formed by mixing the acrylate copolymer component and polyamide component serves to crystallize the polyamide domains so that the polyamide becomes solid and therefore cannot coalesce to form a continuous phase upon subsequent mixing, e.g., when mixed with an amine curative to form a curable composition. The temperature below which the blend must be cooled can be determined by measuring the crystallization peak temperature according to ASTM D3418-08. The polyamide-filled acrylate copolymer compositions may exhibit multiple crystallization peak temperatures. In such cases, the lowest crystallization peak temperature is taken as the temperature below which the blend must be cooled to fully solidify the polyamide component. Generally, the blend will be cooled to 40° C. or less, which is sufficient to solidify the polyamides useful in the practice of the present invention.

The curable acrylate copolymer compositions described herein also comprise an amine curative. Preferably the amine curative is a diamine curative or certain other nitrogen-containing curatives, such as diamine carbamates that generate diamines. The curative will typically be present in an amount of from 0.1 to 10 parts per hundred parts of acrylate copolymer, preferably 0.3-2 parts, more preferably 0.4-1 part.

Examples of suitable aromatic amines include 4,4'-bis(4-aminophenoxy)biphenyl, 4,4'-diaminodiphenyl sulfide, 1,3-bis(4-aminophenoxy)-2,2-dimethylpropane, 4,4'-diaminophenyl sulfone, 2,2-bis[4-(4-aminophenoxy)phenyl]hexafluoropropane, 4,4'-oxydianiline, 4,4'-methylenedianiline, 4,4'-diaminobenzanilide, 1,3-bis(4-aminophenoxy)benzene, 2,2-bis[4-(4-aminophenoxy)phenyl]propane, and phenylene diamine. Examples of suitable aliphatic amine and other curatives include hexamethylenediamine, hexamethylenediamine carbamate, N,N'-cinnamylidene-1,6-hexanediamine, ethylenediamine, diethylene triamine, cyclohexane diamine, propylenediamine and butylenediamine.

In the curable acrylate copolymer composition, the preferable molar ratio of primary amine groups in the polyamine curative to carboxylic acid or carboxylic anhydride or epoxy cure site monomer residues in the polymer is in the range of 0.2 to 2.0, more preferably in the range of 0.5 to 1.5, and most preferably in the range of 0.75 to 1.0.

The addition of curative to the polyimide-reinforced acrylate copolymer composition will desirably take place at a temperature below the decomposition temperature of the curative and below the temperature at which the crosslinking reaction occurs with the carboxyl, anhydride or epoxy groups of the acrylate copolymer. Generally, the addition will take place at a temperature below 140° C., preferably at a temperature no greater than 120° C. The addition of the curative may take place simultaneously with the addition of optional processing ingredients, such as colorants, conventional carbon black or mineral reinforcing agents, antioxidants, processing aids, fillers and plasticizers, or it may be an operation separate from addition of other ingredients. The addition may be conducted on a two-roll rubber mill or by using internal mixers suitable for compounding gum rubber compositions, including Banbury® internal mixers, Haake Rheocord® mixers, Brabender Plastograph® mixers, Farrel Continuous Mixers, or single and twin screw extruders.

Accelerators are examples of additives that are useful in certain embodiments. That is, the rate of the amine cure may be increased by the presence of basic vulcanization accelerators as generally known in the art. The accelerator may be a guanidine, an arylguanidine, an alkylguanidine, an amidine, mixtures and salts thereof, or other materials as disclosed in U.S. Pat. No. 3,883,472. Representative accelerators include tetramethylguanidine, tetraethylguanidine, diphenylguanidine, di-orthotolyl guanidine and 1,8-diazabicyclo[5.4.0]undec-7-ene (DBU). The concentration of guanidine or amidine type accelerators is generally in the range of 0.5 to 5 phr of acrylate copolymer, preferably 1 to 3 phr. Preferred accelerators are DBU and DBU salts of organic acids due to their low toxicity and good cure acceleration.

For example, a typical curing process might utilize 1.0 phr of hexamethylenediamine carbamate and 1 phr of DBU salt based on 100 parts of acrylate copolymer elastomer, along with other ingredients. After blending on a roll mill, a curing step of 10 minutes at 175° C. at a pressure of at least 10 MPa may be executed.

To achieve optimal heat aging resistance, an antioxidant is desirably added to the curable acrylate copolymer composition prior to curing. Useful antioxidants include, but are not limited to, aryl amines, phenolics, imidazoles, and phosphites. Thus, in some embodiments, the antioxidant will be a phosphorus ester antioxidant, a hindered phenolic antioxidant, an amine antioxidant, or a mixture of two or more of these compounds. The proportion of the antioxidant compound in the composition is typically 0.1 to 5 phr, preferably about 0.5 to 2.5 phr. The weight ratio of the phenolic or amine antioxidant to the phosphorus compound in the mixtures is about 0.5 to 3, and preferably the ratio is about 1.

Examples of aryl amines that may be useful antioxidants include 4,4'-bis(α,α-dimethylbenzyl)diphenylamine, diphenylamine and alkylated diphenylamines, 4-aminodiphenyl amine (which also acts as a scorch retarder), and N-phenyl-N'-(p-toluenesulfonyl)-p-phenylenediamine. Examples of phenolic antioxidants include 4,4'-butylenebis(6-t-butyl-m-cresol), 1,3,5-trimethyl-2,4,6-tris-(3,5-di-t-butyl-4-hydroxybenzyl)benzene, and 4,4'-thiobis-(3-methyl-6-t-butylphenol). Examples of phosphite anti-oxidants include triphenylphosphite, bis(2,4-di-t-butylphenyl)pentraerythritol diphosphite, and tris(2,4-ditert-butylphenyl)phosphite. Examples of imidazole antioxidants include 2-mercaptomethylbenzimidazole, and 2-mercaptobenzimidazole. Combinations of antioxidants may be used, generally at levels between 0.5 and 5 phr based on 100 parts of the acrylate copolymer rubber in the compound.

Suitable hindered phenolic antioxidants can be, for example 4, 4'-butylidenebis(6-t-butyl-m-cresol), 1,3,5-trimethyl-2,4,6-tris-(3,5-di-t butyl-4-hydroxybenzyl)benzene, 2,6-di-t-butyl-a-dimethylamino-p-cresol and 4,4'-thiobis-(3-methyl-6-t-butylphenol).

Preferred antioxidant compositions contain tri(mixed mono- and dinonylphenyl)phosphate mixed with either 4,4'-butylidenebis(6-t-butyl-m cresol) or 4,4'-bis(α,α-dimethylbenzyl)diphenylamine. Preferred antioxidant compositions contain 4,4'-bis(α,α-dimethylbenzyl)diphenylamine (available commercially as Naugard® 445 from Chemtura Corp.). Particularly preferred antioxidant compositions include 4-aminodiphenylamine, at levels up to about 2 phr (parts per hundred parts rubber) based on the acrylate copolymer (i.e. the acrylate rubber) component. Antioxidants may be added while the acrylate rubber is melt mixed with the polyamide, or after the blend has cooled.

The compositions of the invention may also comprise additional polymers provided that when addition of such polymers occurs at a temperature above the melting peak temperature of the polyamide the presence of such polymers does not increase the green strength of the resulting polyamide-filled acrylate composition to above about 2 MPa. For example, the polyamide-filled acrylate copolymer compositions of the invention may be blended with an acrylate copolymer to dilute the polyamide content of the inventive composition by any mixing process, either above or below the melting peak temperature of the polyamide. The acrylate copolymer used for the blending process may be the same as or different from that of the inventive composition, and may further comprise fillers, curatives, or other ingredients. Preferably, such dilution occurs at a temperature below that of the melting peak temperature of the polyamide, and if a curative is present, below the temperature needed to initiate curing.

In addition, the curable acrylate copolymer compositions may optionally comprise additional components including plasticizers, process aids, waxes, pigments, and colorants. Such optional components will generally be present in amounts of from about 0.1 phr to about 30 phr, based on the weight of the acrylate rubber. The addition of such optional components may take place during preparation of the polyamide/acrylate copolymer blend or at the time of mixing of curative and copolymer blend.

In general, compositions that result from mixing acrylate copolymer rubbers and polyamides may comprise a wide range of blend morphologies, ranging from those wherein discrete, discontinuous polyamide particles exist within a continuous amorphous acrylate copolymer matrix, to compositions wherein high aspect ratio polyamide "threads" are present, to compositions that comprise co-continuous structures, to compositions comprising discrete acrylate copolymer domains within a continuous phase of polyamide. Most of these compositions have morphologies that are unsuitable for use in the present invention, because the blends have very high Mooney viscosities, i.e. Mooney viscosity ML 1+4, 100° C. of greater than about 120, and/or poor elastic properties such as a low tensile elongation to break, and high compression set. However, if the ratio of components is chosen as described herein, polyamide-filled acrylate copolymer compositions can be produced that have Mooney viscosities below about 120 mL 1+4, 100° C. and good elastic properties. Such polyamide-filled acrylate copolymer compositions of the invention and those suitable for use in the processes of the invention are characterized by having green strengths of less than about 2 MPa, as determined by measurement in accordance with ASTM D6746-10. The resultant compositions have good processability and elastic properties. A green strength value less than about 2 MPa is a basic characteristic of the compositions of the invention and is confirmatory of the presence of a continuous acrylate copolymer phase and a discontinuous polyamide phase in the polyamide-filled acrylate copolymer compositions. By "discontinuous polyamide phase" is meant that the polyamide is present in the polymer blend compositions of the invention as dispersed particles, or domains surrounded by a continuous amorphous acrylate copolymer matrix. In general, the polyamide domains will be completely isolated from each other within the continuous amorphous acrylate copolymer matrix. However, in certain instances a small percentage, less than about 5%, of localized sites in the polymer blend composition may exist wherein the polyamide domains are aggregated or connected to each other. Such polymer blend compositions that have green strengths of less than about 2 MPa are considered to comprise a discontinuous polyamide phase for purposes of the invention. Preferably, the green strength of the polyamide-filled acrylate copolymers will be below about 1 MPA.

A green strength greater than 2 MPa indicates the blend has high Mooney viscosity, poor extrusion processability, or poor elastic properties after curing. These deficiencies may arise because the polyamide phase of the blend is continuous or co-continuous with the acrylate copolymer, or because the end groups of the polyamide have reacted with the cure site of the acrylate copolymer to an extent that the acrylate polymer has gelled, or any combination of the two.

In another embodiment, the invention is directed to a process for production of an acrylate copolymer composition to which an amine curative may subsequently be added to provide a curable polyamide-filled acrylate copolymer composition. The process comprises a first step of providing a polymer blend composition comprising 40 to 90 wt. % of an amorphous acrylate copolymer as described herein and 10-60 wt. % of a polyamide having a melting peak temperature at least about 160° C. as determined in accordance with ASTM D3418-08 wherein the weight percentages of the amorphous acrylate copolymer and polyamide are based on the total weight of amorphous acrylate copolymer and polyamide. In a second step the polymer blend composition is mixed at a temperature above the melting peak temperature of the polyamide thereby forming a polyamide-filled acrylate copolymer composition. After being cooled to a temperature less than the crystallization peak temperature of the polyamide, the resultant polyamide-filled acrylate copolymer composition comprises a continuous acrylate copolymer phase and a discontinuous polyamide phase and has a green strength of less than about 2 MPa as determined according to ASTM D6746-10. Cooling will generally preferably be to a temperature of less than 40° C. Addition of an amine curative to the composition at a mixing temperature below about 140° C. provides a curable composition.

Curing or crosslinking (also referred to as vulcanization) of the curable polyamide-filled acrylate copolymer compositions of the invention, typically involves exposing the curable composition, containing any optional ingredients (i.e. a curable compound) to elevated temperature and elevated pressure for a time sufficient to crosslink the acrylate copolymer. Such operations generally are conducted by placing the curable polyamide-filled acrylate copolymer composition into a mold that is heated in a press (often referred to as press-curing). Alternatively, the curable compositions may be extruded into various shapes. Such extruded shapes or parts are often cured in a pressurized autoclave. After the press cure or autoclave cycle is completed, this initial cure may be followed by an optional post-cure heating cycle at ambient pressure to further cure the acrylate copolymer. For example, the vulcanizate may be formed and cured using conventional press cure procedures at about 160° C. to about 200° C. for about 2 to 60 minutes. Post-cure heating may be conducted at about 160° C. to about 200° C. for one to several hours. Once crosslinked, the compositions described herein are not thermoplastic, but thermoset. Suitable cure conditions will depend on the particular curable compound formulation and are known to those of skill in the art.

A further embodiment of the invention relates to curable acrylate copolymers that include conventional reinforcing fillers in addition to polyamide filler. Such reinforcing fillers are known to those skilled in the art, and include carbon black, amorphous precipitated and fumed silica, crystalline silica such as diatomaceous earth clays such as, kaolin, bentonite, laponite, and montmorillonite, silicate minerals such as magnesium silicate, titanium dioxide, wollastonite, antimony oxide, hydrated alumina, calcium carbonate, barium sulfate, and mixtures of these fillers. The fillers optionally may be modified using organic compounds by known methods to improve either the dispersion in the acrylate copolymer or the adhesion to the acrylate copolymer. Such methods include treating the filler with organo-silanes or quaternary ammonium compounds. Conventional reinforcing fillers are most preferably added after production of the polyamide-filled acrylate copolymer composition, at a mixing temperature less than the melting peak temperature of the polyamide. This process ensures that the filler resides in the acrylate copolymer phase.

As has been described herein, it is a basic characteristic of the polyamide-filled compositions of the present invention that they have enhanced heat resistance compared to similar compositions wherein only reinforcing fillers are present. Although the presence of reinforcing fillers is generally detrimental to heat resistance, it has been found that in certain instances cured acrylate copolymers having good heat resistance can be formed when particular blends of polyamide filler and one or more reinforcing fillers is present. Such reinforced compositions consist essentially of a) a polymer blend composition comprising i) 40 to 90 wt. % of an amorphous acrylate copolymer as described herein and ii) 10-60 wt. % of a polyamide having a melting peak temperature at least 160° C., the weight percentages being based on the total weight of acrylate copolymer and polyamide, b) an amine curative, and c) a reinforcing filler. The amount of reinforcing filler present is an amount which does not result in an excessive increase in Shore A hardness of the cured polyamide-filled acrylate copolymer composition. The appropriate amount of reinforcing filler may be easily determined by the following method. Two curable acrylate copolymer compounds are prepared, differing only in presence of reinforcing filler. One compound comprises no reinforcing filler, while the other comprises a quantity of reinforcing filler or fillers. The two compounds are cured by exposure to a temperature of 175° C. for 10 minutes in a closed mold at a pressure of at least 10 MPa to form test specimens of thickness 1 to 2.5 mm, followed by exposure of the unmolded, cured compositions to a temperature of 175° C. for 4 hours in a hot air oven. Shore A hardness of the molded and post cured samples is determined at a test temperature of 21° to 25° C. according to ASTM D 2240-06 (1 second reading). Subtracting the Shore A hardness of the unfilled sample from that of the filled sample reveals the Shore A hardness increase attributable to the filler content of the filled sample. Curable compounds comprising polyamide filled acrylate copolymers wherein any non-polyamide reinforcing filler content present results in an increase in the Shore A hardness of no more than about 20 points as determined by the previously described method will have the heat resistance that is characteristic of the compositions of the invention.

The vulcanizates prepared from the polyamide-filled acrylate copolymer compositions described herein exhibit unusually good resistance to embrittlement during heat aging, as evidenced by a reduction in the amount of decrease in tensile elongation at break following heat aging at 190° C. for two to three weeks and a reduction in the increase in Shore A hardness as a result of heat aging. Furthermore, these advantages are gained with no sacrifice in compression set resistance. In most cases, the present invention provides cured compositions having improved compression set resistance when curative levels similar to those used in a conventional compound are utilized. For example, acrylate copolymer elastomers comprising very low levels of copolymerized ethylene units (2 weight % or less) tend to harden severely during hot air aging in the presence of carbon black. Replacing the carbon black with a polyamide as a reinforcing filler can reduce the Shore A increase after hot air aging for one week at 190° C. by over 50%. Polyacrylates comprising high levels of ethylene (30 to 50% by weight), on the other hand, tend to lose elongation at break during hot air aging. In these cases, replacement of carbon black with a polyamide filler can decrease the percentage loss of elongation during a 3 week aging test at 190° C. by over 50%. This degree of improvement is unusual.

Vulcanizates of the polyamide-filled acrylate copolymer compositions prepared by the processes described herein can be used in a wide variety of industrial applications, for production of articles including wire and cable jacketing, spark plug boots, hoses, belts, miscellaneous molded boots, seals and gaskets. Hose applications include turbo charger hoses, transmission oil cooler hoses, power steering hoses, air conditioning hoses, air ducts, fuel line covers, and vent hoses.

Examples of seals include engine head cover gaskets, oil pan gaskets, oil seals, lip seal packings, O-rings, transmission seal gaskets, seal gaskets for a crankshaft or a camshaft, valve stem seals, power steering seals, and belt cover seals.

Automotive tubing applications include axle vent tubing, PCV tubing and other emission control parts. The vulcanizates are also useful for manufacture of crankshaft torsional dampers where high damping over a broad temperature range is needed under high compressive and shear strains. The vulcanizates also can be used to prepare noise management parts such as grommets.

The invention is further illustrated by the following examples wherein all parts are by weight unless otherwise indicated.

EXAMPLES

Materials

Acrylate Copolymers

A1 Copolymer of methyl acrylate, ethylene and monoethyl maleate comprising 55 wt. % (about 29 mole %) copolymerized methyl acrylate units, and approximately 2 wt. % (about 0.6 mol %) copolymerized units of monoethyl maleate; Mooney viscosity (ML 1+4) at 100° C. of 33.

A2 Copolymer of methyl acrylate, ethylene, and monoethyl maleate comprising 55 wt. % (about 30 mole %) copolymerized units of methyl acrylate, and approximately 4 wt. % (about 1.3 mol %) copolymerized units of monoethyl maleate; Mooney viscosity (ML 1+4) at 100° C. of 17.

A3 Copolymer of ethyl acrylate, butyl acrylate and a carboxylic acid-containing cure site monomer comprising about 74 wt. % copolymerized units of ethyl acrylate, 24 wt. % copolymerized butyl acrylate units and approximately 1.5 wt. % (about 1 mol %) copolymerized units of carboxylic acid-containing cure site monomer; Mooney viscosity (ML 1+4) at 100° C. of 42. Available as Nipol® AR-212HR from Zeon Chemicals LP.

A4 Copolymer of ethyl acrylate, butyl acrylate, ethylene and a carboxylic acid-containing cure site monomer comprising approximately 67.8 wt. % copolymerized units of ethyl acrylate, approximately 29.8 wt. % copolymerized units of butyl acrylate, about 1.5 wt. % (about 5.5 mol %) copolymerized units of ethylene, and approximately 0.9 wt. % (about 0.5 mol %) by weight copolymerized units of a carboxylic acid-containing cure site monomer, Mooney viscosity (ML 1+4) at 100° C. of 46. Available as ER-A413 from Denki Kagaku Kogyo KK.

A5 Copolymer of ethyl acrylate, butyl acrylate a chlorine-containing cure site monomer, and a carboxyl-containing cure site monomer; Mooney viscosity (ML 1+4) at 100° C. of 27. Available as HyTemp® 4052EP from Zeon Chemicals LP.

A6 Copolymer of methyl acrylate, ethylene and glycidyl methacrylate comprising 55 wt. % copolymerized units of methyl acrylate (about 30 mole %), and approximately 2 wt. % (about 0.6 mol %) copolymerized units of glycidyl methacrylate, an epoxide-containing cure site monomer; Mooney viscosity (ML 1+4) at 100° C. of 28.

A7 Copolymer of methyl acrylate, ethylene and monoethyl maleate comprising 66 wt. % copolymerized units of methyl acrylate (about 40 mol %), and approximately 2 wt. % (about 0.7 mol %) copolymerized units of monoethyl maleate.

A8 Copolymer of methyl acrylate, ethylene and monoethyl maleate comprising 55 wt. % copolymerized units of methyl acrylate (about 30 mol %), and approximately 2.5 wt. % (about 0.8 mol %) copolymerized units of monoethyl maleate.

Polyamides

P1 Polyamide 6, inherent viscosity of 0.867 dL/g, melting peak temperature of 220° C., available from BASF as Ultramid® B24.

P2 Polyamide 6, inherent viscosity of 0.978 dL/g, melting peak temperature of 220° C., available from BASF as Ultramid® B27.

P3 Polyamide 6, inherent viscosity of 1.450 dL/g, melting peak temperature of 220° C., available from BASF as Ultramid® B40.

P4 Polyamide copolymer comprising copolymerized units of hexamethylene diamine, adipic acid, and terephthalic acid, melting peak temperature of approximately 262° C., amine end group concentration of about 74 meq/kg, and inherent viscosity of 0.892 dL/g.

P5 Polyamide 6/6, having a melting peak temperature of approximately 260° C., amine end group concentration of about 50 meq/kg, and inherent viscosity of 1.002 dL/g.

P6 Polyamide 6/10, having a melting peak temperature of approximately 225° C., amine end group concentration of about 63 meq/kg, and inherent viscosity of 1.167 d L/g.

P7 Polyamide 6, inherent viscosity of 1.24 dL/g, and a melting peak temperature of 220° C. Available from BASF as Ultramid® B33.

P8 Amorphous polyamide with a glass transition midpoint of about 125° C.

P9 Polyamide 6/6, having a melting peak temperature of approximately 260° C., amine end group concentration of about 29 meq/kg, and inherent viscosity of 1.634 dL/g.

Comparative Polymers

CP1 Ethylene vinyl acetate copolymer comprising 40% by weight vinyl acetate.

CP2 Linear low density polyethylene available from ExxonMobil Corp. as LL1001.59.

CP3 Thermoplastic rubber vulcanizate comprising a dynamically crosslinked acrylate elastomer dispersed in polybutylene terephthalate thermoplastic, available from DuPont as ETPV 60A01L NC010.

CP4 Fluoroelastomer comprising 60% by weight vinylidene fluoride and 40% hexafluoropropylene, having a Mooney viscosity (ML1+10, 121° C.) of 25.

CP5 Polyvinylidene fluoride, available from Arkema Inc. as Kynar® 461 polyvinylidene fluoride resin.

CP6 Polybutylene terephthalate, available from DuPont as Crastin® 6219 thermoplastic polyester resin.

Other Ingredients

Curative 1: Diak™ 1, hexamethylenediamine carbamate curative available from DuPont Performance Polymers.

Curative 2: Sodium stearate, available from Sigma-Aldrich.

Curative 3: Magnesium oxide, available from HallStar Corp. as Maglite® D.

Curative 4: tris(hydroxymethyl)aminomethane, available from Sigma-Aldrich.

N550 Carbon black: available from Cabot Corp. as Sterling SO carbon black.

N990 Carbon black: available from Cancarb Corp. as Thermax® N990

Silica: available from Evonik Corp. as Ultrasil® VN3

Antioxidant (AO-1): Naugard® 445 antioxidant, available from Chemtura Corp.

Antioxidant (AO-2): 4-aminodiphenylamine (CAS 101-54-2), available from Sigma-Aldrich, also functions as a scorch retarder.

Antioxidant (AO-3): N-isopropyl-N'-phenyl-1,4-phenylenediamine (CAS 101-72-4), available from Sigma-Aldrich.

Process aid: Vanfre® VAM organic phosphate ester, available from RT Vanderbilt.

Scorch retarder: Stearylamine, available from Akzo Nobel as Armeen® 18D.

Accelerator 1: Vulcofac® ACT-55, tertiary amine complex absorbed in an amount of 70 wt. % on a silica carrier, available from Safic-Alcan.

Accelerator 2: 3-(3,4-Dichlorophenyl)-1,1-dimethylurea, available from Sigma-Aldrich.

Accelerator 3: 1,8-diazabicyclo[5.4.0]undec-7-ene, available from Sigma-Aldrich.

Test Methods

Mooney viscosity: ASTM D1646, ML 1+4, 100° C.

Cure response: Measured per ASTM D5289-07a using an MDR 2000 from Alpha Technologies operating at 0.5° arc. Test conditions of 177° C. for 24 minutes. ML refers to the minimum torque value measured during the test, while MH refers to the maximum torque value attained after ML. T50 and T90 refer to the time to 50% and 90% torque, respectively, of the difference between MH and ML.

Compression set: ISO 815-1:2008, 25% compression, using type B molded buttons prepared using press cure conditions of 175° C. for 10 minutes followed by a four hour post cure in a hot air oven at 175° C. Time and temperature of the test conditions as specified. Data reported are the median values of 3 specimens.

Tensile properties: ASTM D412-06, die C. Samples cut from 1.5 to 2.5 mm thick test specimens press cured at 175° C. for 10 minutes and post cured 4 hours at 175° C. in a hot air oven. Data reported are the median value of 3 specimens. Stress at elongations of 25%, 50%, 100%, and 200% are listed as M25, M50, M100, and M200, respectively. The rupture properties of tensile strength and elongation are indicated as Tb and Eb, (tensile at break and elongation at break, respectively). Test temperature is 23° C.±2° C.

Shore A hardness: measured using 6 mm thick samples composed of 2 mm thick plies, aged for 24 hours at ambient conditions of 23° C. and 50% relative humidity, per ASTM D2240-05 test method, using a type 2 operating stand. The median value of 5 readings is reported.

Heat aging: Tensile specimens, prepared as described above are hung in a hot air oven for the specified time and temperature. The specimens are conditioned at ambient conditions of 23° C. and 50% RH for at least 24 hours before tensile properties are measured.

Green strength: Measured in accordance with ASTM D6746-10 on the uncured blend of acrylate copolymer and polyamide, prior to the addition of any other ingredients. The blend is sheeted on a roll mill to about 2.5 mm thickness, then molded in a cavity having dimensions of 2 mm×76.2 mm×.152.4 mm. Molding conditions are 100° C. for 5 minutes under 30 tons of pressure. Following removal from the press, the molded plaque is cooled for 30 minutes at room temperature between metal sheets. ASTM D412 Die C tensile specimens are then cut from the molded plaque in a direction parallel to the grain of the milled sheet. Median yield stress is reported. Test temperature is 23° C.±2° C.

Inherent viscosity of polyamides: Measured in accordance with ASTM D2857-95, using 96% by weight sulfuric acid as a solvent at a test temperature of 25° C. Samples were dried for 12 hours in a vacuum oven at 80° C. prior to testing.

Crystallization peak temperature: Measured in accordance with ASTM D3418-08.

Example 1

A series of polyamide-filled acrylate copolymers, 131-B11, was prepared by mixing an acrylate copolymer (A1 or A8) with a polyamide (P1, P2 or P3) in the ratios shown in Table 1. The polyamide-filled acrylate copolymer blends were prepared using either Blend Method M or Blend Method E, as indicated in the table.

Blend Method M consisted of the following steps: Polymers and any other ingredients were charged to a Haake Rheocord mixing bowl equipped with roller blades, operated at a set temperature of 20° C. greater than the melting peak temperature of the polyamide and at about 30 rpm rotor speed. Once the mixing bowl was fully charged, the rotor speed was increased to 100 rpm. Polymer blend melt temperature was monitored, and when the polymer blend temperature reached the melting peak temperature of the polyamide component, a timer was started. At the same time, the setpoint for the bowl temperature was lowered to match the melting peak temperature of the polyamide, and air cooling of the bowl was initiated. After three minutes of mixing, the rotors were stopped, at which point the temperature of the polymer blend was in the range of 20° C. to 35° C. greater than the melting peak temperature of the polyamide. The polyamide-filled acrylate copolymer blend was then removed from the bowl and cooled to room temperature (about 25° C.) before further processing.

Blend Method E consisted of the following steps: Polyamide was metered by weight loss feeder into the first barrel section of a 43 mm Berstorff co-rotating twin screw extruder with twelve barrel sections, operating at a screw speed of 250 rpm. At the same time, acrylate copolymer was metered into the fourth section of the extruder via a specially configured extruder and a melt pump for accurate feed rates. Melt temperature of the polyamide/acrylate copolymer blend reached about 280° C. After exiting the twelfth barrel section, the resultant polyamide-filled acrylate copolymer was pelletized and cooled to 25° C. before further processing.

Green strengths of the polyamide-filled acrylate copolymer compositions are reported in Table 1.

Curable polyamide-filled acrylate copolymer compositions were prepared by compounding the polyamide-filled acrylate copolymer compositions and additional ingredients on a roll mill. The compound formulations of polyamide-filled acrylate copolymer compositions B1-B11 are shown in Table 2. The resultant curable compositions were cured as described in the test method section above (tensile properties) and tensile strength, elongation at break and modulus were determined according to the above-described ASTM methods. Cure response and compression set were also determined. The data reported for the cured compositions illustrate the improvement in physical properties of the cured polyamide-filled acrylate copolymer elastomer that is obtained when the green strength of the uncured polyamide-filled acrylate copolymer composition is less than about 2 MPa and the level of polyamide filler is between 10-60 wt. %, based on the combined weight of the polyamide and acrylate copolymer. Each of the comparative example curable compositions CE1-CE6 is either based on a polyamide-filled acrylate copolymer blend composition that has a green strength greater than 2 MPa or is based on a polyamide-filled acrylate copolymer blend that contains polyamide at a level outside the range of 10-60 wt. %, based on the combined weight of the polyamide and acrylate copolymer.

TABLE 1

| | Composition | | | | | | | | | | |
|---|---|---|---|---|---|---|---|---|---|---|---|
| Polymer | B1 % | B2 % | B3 % | B4 % | B5 % | B6 % | B7[1] % | B8 % | B9 % | B10 % | B11 % |
| A1 | 95 | 80 | 60 | 95 | 80 | 60 | 40 | 40 | 35 | | |
| A8 | | | | | | | | | | 60 | 45 |
| P1 | 5 | 20 | 40 | | | | | | | | |
| P2 | | | | | | | | | | 40 | 55 |
| P3 | | | | 5 | 20 | 40 | 60 | 60 | 65 | | |
| Blend method | M | M | M | M | M | M | M | E | E | E | E |
| Green strength (MPa) | 0.2 | 0.3 | 2.5 | 0.1 | 0.3 | 0.5 | 2.4 | 1.9 | 4.2 | 3.8 | 6.6 |
| Crystallization peak temperature (° C.) | 168 | 84 | 173 | 77 | 81 | 88 | 85 | nm | nm | 94 | 92 |

[1]The blending method may affect the morphology of the polyamide-filled ethylene copolymer compositions. Consequently, the green strength of compositionally identical polyamide-filled acrylate copolymer compositions can differ, as illustrated by blends B7 and B8.
[2]nm - not measured

TABLE 2

| | Composition[1] | | | | | | | | | |
|---|---|---|---|---|---|---|---|---|---|---|
| | CE1 | E1 | CE2 | CE3 | E2 | E3 | CE4[2] | E4 | CE5 | CE6 |
| B1 | 105.26 | | | | | | | | | |
| B2 | | 125 | | | | | | | | |
| B3 | | | 166.67 | | | | | | | |
| B4 | | | | 105.26 | | | | | | |
| B5 | | | | | 125 | | | | | |
| B6 | | | | | | 166.67 | | | | |
| B7 | | | | | | | 250 | | | |
| B8 | | | | | | | | 250 | | |
| B9 | | | | | | | | | 166.67 | |
| B10 | | | | | | | | | | 222.2 |
| Curative 1 | 0.6 | 0.6 | 0.6 | 0.6 | 0.6 | 0.6 | 0.6 | 0.6 | 0.6 | 0.6 |
| Accelerator 1 | 1 | 1 | 1 | 1 | 1 | 1 | 1 | 1 | 1 | 1 |
| Scorch Retarder | 0.5 | 0.5 | 0.5 | 0.5 | 0.5 | 0.5 | 0.5 | 0.5 | 0.5 | 0.5 |
| Process Aid | 0.5 | 0.5 | 0.5 | 0.5 | 0.5 | 0.5 | 0.5 | 0.5 | 1 | 1 |
| AO-1 | 2 | 2 | 2 | 2 | 2 | 2 | 2 | 2 | 2 | 2 |
| Cure response | | | | | | | | | | |
| MI (dN-m) | 0.9 | 1.2 | 3.8 | 0.8 | 1.3 | 2.4 | 10.6 | 4.1 | 2.9 | 5.7 |
| MH (dN-m) | 4.2 | 6.3 | 16.2 | 4.3 | 5.5 | 10.6 | 24.3 | 25.9 | 19.9 | 32.6 |
| MH − ML (dN-m) | 3.3 | 5.1 | 12.4 | 3.5 | 4.2 | 8.2 | 13.7 | 21.8 | 17 | 26.9 |
| Shore A hardness and tensile properties after press cure and post cure | | | | | | | | | | |
| Shore A Hardness | 38 | 45 | 79 | 37 | 45 | 63 | 80 | 82 | 85 | 89 |
| M25 (MPa) | 0.4 | 0.6 | 7.8 | 0.4 | 0.6 | 1.1 | 9.5 | 6.6 | | |
| Tb (MPa) | 3.1 | 9.4 | 16.3 | 3.3 | 8.3 | 17.7 | 26.2 | 29.1 | 19.7 | 28.1 |
| Eb (%) | 450 | 355 | 75 | 465 | 350 | 255 | 90 | 120 | 19 | 23 |
| Compression Set, 70 hrs/175° C. | | | | | | | | | | |
| (%) | 28 | 29 | 76 | 26 | 29 | 30 | 54 | 46 | 93 | 92 |

[1]Curable polyamide-filled acrylate copolymer compositions, amounts of all ingredients are in parts per hundred of acrylate copolymer
[2]Although CE4 and E4 are compositionally identical, tensile properties and compression set differ due to the morphology and green strength differences of compositions B7 and B8.

Example 2

Two polyamide-filled acrylate copolymer compositions, B12 and B13, were prepared by mixing an acrylate copolymer (A5 or A6) with polyamide P3 in the ratios shown in Table 3 using Blend Method M. A5 is an acrylate copolymer that is not curable by crosslinking with an amine curative. A6 is an acrylate copolymer that is amine-curable.

TABLE 3

| | Composition | |
|---|---|---|
| | B12 % | B13 % |
| A5 | 75 | |
| A6 | | 75 |
| P3 | 25 | 25 |
| Blend method | M | M |
| Green strength (MPa) | 0.1 | 0.2 |
| Crystallization peak temperature (° C.) | 150 | 154 |

The polyamide-filled acrylate copolymer compositions of Table 3 were cooled after the acrylate copolymer was blended with polyamide. They were then compounded on a roll mill to form curable compositions CE8 and E5, as shown in Table 4. For comparison, two conventional carbon black reinforced compounds that contain acrylate copolymers A5 and A6 (CE7 and CE9) were produced by mill mixing. The E5 and CE7-CE9 compositions were cured as described in the test method section above and tensile strength, elongation at break and modulus were determined according to the above-described ASTM methods. Cure response and compression set were also determined. Physical properties were as shown in Table 4.

TABLE 4

| | Composition | | | |
|---|---|---|---|---|
| | CE7 phr | CE8 phr | CE9 phr | E5 phr |
| A5 | 100 | | | |
| B12 | | 133.33 | | |
| A6 | | | 100 | |
| B13 | | | | 133.33 |
| Curative 2 | 4 | 4 | | |
| Accelerator 2 | 4 | 4 | | |
| Curative 1 | | | 1.1 | 1.1 |
| Accelerator 3 | | | 1 | 1 |
| AO-1 | 2 | 2 | 2 | 2 |
| Process aid | 1 | 1 | 0.5 | 0.5 |
| N550 carbon black | 55 | | 30 | |
| Cure Response | | | | |
| ML (dN-m) | 1.2 | 1 | 0.3 | 0.1 |
| MH (dN-m) | 5.5 | 3 | 6.4 | 5.2 |
| MH − ML | 4.3 | 2 | 6.1 | 5.1 |
| Tensile Properties and Shore A Hardness After Press Cure and Post Cure | | | | |
| Shore A | 52 | 46 | 62 | 59 |
| Tb (MPa) | 10 | 4.1 | 13.9 | 7.5 |
| Eb | 350 | 155 | 180 | 140 |
| Compression Set, 70 Hours/150° C. | | | | |
| (%) | 51 | 68 | 57 | 57 |

Because the chlorine cure site in A5 decomposes at the temperature required for melt mixing polyamide, CE8 has a cure response (MH-ML) of only 2 dN-m. The low cure response of CE8 leads to inferior Shore A hardness, tensile strength, and compression set compared to conventional compound CE7, based on the same acrylate rubber but reinforced with carbon black. The amine curable rubber (A6) provides similar cure response in both the polyamide blend of E5 and conventional compound CE9 containing carbon black. E5 exhibits Shore A hardness and compression set similar to CE9, and acceptable tensile strength.

Example 3

Blend method M, described in Example 1, was used to prepare three blend compositions B14-B16 composed of acrylate copolymer A2 and polyamide P2 wherein the polymer components A2 and P2 were present in the same ratio in each blend. The B14-B16 blend compositions differed only in the presence or absence of curative and the type of curative used during the process of mixing with molten polyamide. Dynamic curing of the acrylate copolymer component A2 occurred during the process of mixing A2 and P2 with Curatives 3 and 4 to form compositions B14 and B15. Composition B14 was prepared by mixing acrylate copolymer A2 and polyamide P2 in the presence of magnesium oxide (Curative 3) thereby forming a composition comprising an ionically crosslinked acrylate copolymer (a magnesium ionomer) dispersed in a polyamide matrix. Composition B15 was prepared by mixing acrylate copolymer A2 and polyamide P2 in the presence of Curative 4 thereby forming a composition comprising covalently crosslinked acrylate copolymer A2 dispersed in polyamide P2. Composition B16 was prepared by mixing A2 and P2 in the absence of a curative. The green strength of composition B16 after mixing and cooling was 0.3 MPa while the green strengths of compositions B14 and B15 were 9.1 and 7.8 MPa, respectively. B14 and B15 were not processable at temperatures below 160° C. and crumbled during the Mooney viscosity determination. The B16 composition was further processed by mixing on a roll mill with the ingredients shown in Table 6 to form an amine-curable polyamide-filled acrylate copolymer composition. The composition, E6, was cured using the conditions described in the test method section above. Cure response and physical properties were as shown in Table 6.

TABLE 5

| | Composition | | |
|---|---|---|---|
| | B14 phr | B15 Phr | B16 phr |
| A2 | 100 | 100 | 100 |
| P2 | 66.67 | 66.67 | 66.67 |
| AO-1 | 0.833 | 0.833 | |
| Curative 3 | 2 | | |
| Curative 4 | | 0.75 | |
| Green Strength (MPa) | 9.1 | 7.8 | 0.3 |
| Mooney Viscosity | * | * | 38 |

* no data; samples crumbled during test

TABLE 6

| | Composition E6 Phr |
|---|---|
| B16 | 166.67 |
| Curative 1 | 0.6 |
| Accelerator 3 | 1 |
| Scorch retarder | 0.5 |

TABLE 6-continued

| | Composition E6 Phr |
|---|---|
| Process aid | 0.5 |
| AO-1 | 2 |
| Cure response | |
| ML (dN-m) | 3.3 |
| MH (dN-m) | 7.5 |
| Shore A hardness and tensile properties after press cure and post cure | |
| Shore A | 58 |
| M25 (MPa) | 0.9 |
| M50 (MPa) | 1.5 |
| M100 (MPa) | 3.7 |
| M200 (MPa) | 11.2 |
| Tb (MPa) | 13.9 |
| Eb (%) | 240 |

Example 4

Composition B17, a polyamide-filled acrylate copolymer composed of 60 wt. % acrylate copolymer A1 and 40 wt. % polyamide P3 (nylon 6), was produced by extrusion using a 25 mm Berstorff twin screw extruder operated at a screw speed of 250 rpm, an extrusion rate of 26 lb./hr. and a melt temperature of 240° C. The extrudate was smooth and shiny and was collected and cooled to about 25° C. Blend B17 was used to produce composition E7 by roll mill mixing at approximately 50° C. batch temperature with the ingredients shown in Table 7. The cure response, initial tensile properties and hot air aged properties of E7 are also listed in Table 7. Composition B18, a blend of 60% acrylate copolymer A1 and 40% polyamide P6 was produced using the same equipment operated at a screw speed of 150 rpm, an output rate of 20 lb./hr., and a melt temperature of 240° C. The extrudate was rough, nervy, and tough, and performed as if the acrylate elastomer had partially crosslinked or gelled. Melt temperature was increased to 250° C. in an attempt to produce a smooth extrudate, but there was no improvement. The feed rate of the polyamide P6 was then reduced in stages, and extrudate roughness was eliminated when the P6 level had dropped to 25% in the polymer blend.

TABLE 7

| | Composition E7 phr |
|---|---|
| B17 | 166.67 |
| Curative 1 | 0.6 |
| Accelerator 1 | 1 |
| AO-2 | 0.91 |
| Process aid | 1 |
| Cure response | |
| ML (dN-m) | 0.7 |
| MH (dN-m) | 12.7 |
| Shore A and tensile properties after press cure and post cure | |
| Shore A | 65 |
| Tb (MPa) | 19.3 |
| Eb (%) | 290 |
| Shore A and tensile properties after 3 weeks at 190° C. hot air aging | |
| Shore A | 57 |
| Tb (MPa) | 10.3 |
| Eb (%) | 180 |

Example 5

Composition B19, a blend of 60 wt. % acrylate copolymer A8 and 40 wt. % polyamide P7 (nylon 6) was produced by extrusion using a 25 mm Berstorff twin screw extruder operated at a screw speed of 150 rpm, an extrusion rate of 20 lb./hr. and a melt temperature of 250° C. The extrudate was smooth and shiny, was collected and cooled to about 25° C. and was roll mill compounded with the ingredients shown in Table 8 to produce composition E8. Composition E8 exhibited excellent cure response, initial properties, and hot air aged properties. Composition B20, a blend of 60 wt. % acrylate copolymer A8 and 40 wt. % polyamide P4 was produced using the same equipment operated at the same screw speed and extrusion rate, but at a melt temperature of 280° C. The extrudate was rough, nervy, and tough, and performed as if the acrylate elastomer had partially crosslinked or gelled.

TABLE 8

| | Composition E8 phr |
|---|---|
| B19 | 166.67 |
| Curative 1 | 0.6 |
| Accelerator 1 | 1 |
| AO-2 | 0.91 |
| process aid | 1 |
| Cure response | |
| ML (dN-m) | 0.89 |
| MH (dN-m) | 8.5 |
| Shore A and tensile properties after press cure and post cure | |
| Shore A | 60 |
| Tb (MPa) | 18 |
| Eb (%) | 325 |
| Shore A and tensile properties after 3 weeks at 190° C. hot air aging | |
| Shore A | 53 |
| Tb (MPa) | 8.1 |
| Eb (%) | 165 |

Example 6

The compositions shown in Table 9, wherein all amounts are in weight percent, were prepared using a Haake Rheocord® mixer. For each of the polymer blends B21-B29, acrylate copolymer A1 and a second polymeric component (one of Comparative Polymers CP1—CP6 or acrylate copolymer A3) were added to the heated mixing bowl and processed for 3 minutes at 50 rpm. The temperature of the polymer blend was maintained at a point approximately 20° C. higher than the melting peak temperature of the second polymer component if that polymer was a semi-crystalline thermoplastic resin or at 60° C. if the second polymer was an amorphous elastomer. Processing (mixing) temperatures are listed in Table 9. Prior to processing, polymers CP3, CP6, P2, and P4 were dried for 4 hours at 120° C. in a vacuum oven. After processing, the blend compositions were cooled to room temperature (about 25° C.).

TABLE 9

| | Composition | | | | | | | | |
|---|---|---|---|---|---|---|---|---|---|
| | B21 % | B22 % | B23 % | B24 % | B25 % | B26 % | B27 % | B28 % | B29 % |
| A1 | 75 | 75 | 75 | 75 | 75 | 75 | 75 | 75 | 75 |
| CP1 | 25 | | | | | | | | |
| CP2 | | 25 | | | | | | | |
| CP3 | | | 25 | | | | | | |
| CP4 | | | | 25 | | | | | |
| CP5 | | | | | 25 | | | | |
| A3 | | | | | | 25 | | | |
| CP6 | | | | | | | 25 | | |
| P2 | | | | | | | | 25 | |
| P4 | | | | | | | | | 25 |
| Mixing Temp. (° C.) | 80 | 140 | 240 | 60 | 200 | 60 | 240 | 240 | 280 |

Curable compositions CE10 through CE17, E9 and E10 were prepared from blends B21-B29 by mixing the ingredients listed in Table 10 on a roll mill. Composition CE10 is an acrylate copolymer control compound that does not contain a polyamide filler. Cure response, tensile properties, Shore A hardness, and compression set data are also shown in the table.

The cure response data indicate that the CE11 through CE16 compositions have a weak cure response, such that in some cases the MH-ML difference is less than 2.5 dN-m, and in all cases MH-ML is less than 4.0 dN-m. All the comparative examples except CE17 exhibit a smaller cure response than that of the acrylate copolymer control composition (CE10) that does not contain a second polymeric component.

After press cure and post cure according to the conditions described in the test method section herein, compositions E9 and E10, which are compositions of the invention, exhibit a combination of Shore A hardness, heat aging resistance, and compression set unmatched by any of the comparative example compositions. In particular, the E9 and E10 compositions exhibit values of Shore A hardness greater than 40, elongation at break after hot air aging for three weeks at 190° C. of greater than 100%, and a change in elongation at break of less than 50% from the unaged value.

TABLE 10

| | Composition | | | | | | | | | |
|---|---|---|---|---|---|---|---|---|---|---|
| | CE10 phr | CE11 phr | CE12 phr | CE13 phr | CE14 phr | CE15 phr | CE16 phr | CE17 phr | E9 phr | E10 phr |
| A1 | 100 | | | | | | | | | |
| B21 | | 133.3 | | | | | | | | |
| B22 | | | 133.33 | | | | | | | |
| B23 | | | | 133.33 | | | | | | |
| B24 | | | | | 133.33 | | | | | |
| B25 | | | | | | 133.33 | | | | |
| B26 | | | | | | | 133.33 | | | |
| B27 | | | | | | | | 133.33 | | |
| B28 | | | | | | | | | 133.33 | |
| B29 | | | | | | | | | | 133.33 |
| Curative 1 | 1 | 1 | 1 | 1 | 1 | 1 | 1 | 1 | 1 | 1 |
| Accelerator 1 | 1 | 1 | 1 | 1 | 1 | 1 | 1 | 1 | 1 | 1 |
| Scorch retarder | 0.5 | 0.5 | 0.5 | 0.5 | 0.5 | 0.5 | 0.5 | 0.5 | 0.5 | 0.5 |
| AO-1 | 2 | 2 | 2 | 2 | 2 | 2 | 2 | 2 | 2 | 2 |
| Process aid | 0.5 | 0.5 | 0.5 | 0.5 | 0.5 | 0.5 | 0.5 | 0.5 | 0.5 | 0.5 |
| Cure Response | | | | | | | | | | |
| ML (dN-m) | 0.2 | 0.2 | 0.2 | 1.1 | 0.2 | 0.6 | 0.3 | 2.0 | 1.1 | 2.2 |
| MH (dN-m) | 4.8 | 2.9 | 3.0 | 3.6 | 1.0 | 3.6 | 3.9 | 8.2 | 8.6 | 7.6 |
| MH − ML (dN-m) | 4.6 | 2.7 | 2.8 | 2.5 | 0.8 | 3 | 3.6 | 6.2 | 7.5 | 5.4 |
| Tensile Properties and Shore A Hardness After Press Cure and Post Cure | | | | | | | | | | |
| Shore A | 36 | 39 | 55 | 35 | nm[1] | 51 | 30 | 50 | 49 | 49 |
| M50 (MPa) | 0.55 | 0.7 | 1.7 | 0.6 | | 1.2 | 0.4 | 1 | 1 | 0.9 |
| Tb (MPa) | 2.4 | 5.5 | 7.3 | 3.9 | | 9.2 | 1.6 | 9.5 | 6.9 | 11.2 |
| Eb (%) | 470 | 570 | 500 | 360 | | 390 | 415 | 315 | 230 | 260 |
| Tensile Properties and Shore A Hardness After One Week at 190° C. | | | | | | | | | | |
| Shore A | 32 | 34 | 50 | 30 | nm[1] | 47 | 25 | 49 | 48 | 49 |
| M50 (MPa) | 0.4 | 0.5 | 1 | 0.5 | | 0.9 | 0.3 | 0.8 | 0.8 | 1 |
| Tb (MPa) | 1.7 | 2.5 | 1.5 | 2.4 | | 7.9 | 1.4 | 8.9 | 7.3 | 9.4 |
| Eb (%) | 440 | 460 | 120 | 350 | | 355 | 460 | 250 | 205 | 270 |
| Tensile Properties and Shore A Hardness After Two Weeks at 190° C. | | | | | | | | | | |
| Shore A | 24 | 30 | 53 | 29 | nm[1] | 45 | 20 | 49 | 45 | 46 |
| M50 (MPa) | 0.3 | 0.5 | | 0.4 | | 1.0 | 0.2 | 1.0 | 0.7 | 0.7 |
| Tb (MPa) | 0.8 | 2.2 | 1.9 | 1.6 | | 4.8 | 2.5 | 4.3 | 5.9 | 5 |
| Eb (%) | 230 | 125 | 5 | 215 | | 185 | 290 | 150 | 220 | 185 |
| Tensile Properties and Shore A Hardness After Three Weeks at 190° C. | | | | | | | | | | |
| Shore A | 30 | 43 | 57 | 33 | nm[1] | 50 | 25 | 50 | 45 | 45 |
| M50 (MPa) | 0.3 | 1 | | 0.5 | | 1.7 | 0.3 | 1.5 | 0.6 | 0.7 |
| Tb (MPa) | 1 | 1.5 | 2.4 | 1.5 | | 6.6 | 1 | 4.3 | 3.9 | 3.8 |
| Eb (%) | 180 | 80 | 15 | 140 | | 130 | 145 | 105 | 180 | 150 |

TABLE 10-continued

| | Composition | | | | | | | | | |
|---|---|---|---|---|---|---|---|---|---|---|
| | CE10 phr | CE11 phr | CE12 phr | CE13 phr | CE14 phr | CE15 phr | CE16 phr | CE17 phr | E9 phr | E10 phr |
| Change in Shore A Hardness and Elongation at Break After Three Weeks at 190° C. | | | | | | | | | | |
| Shore A (points) | −6 | 4 | 3 | −2 | | −1 | −6 | 1 | −4 | −3 |
| Eb (%) | −62 | −86 | −97 | −61 | | −67 | −65 | −67 | −22 | −42 |
| Compression Set, 70 Hours/150° C. | | | | | | | | | | |
| (%) | 19 | 22 | 13 | 32 | nm[1] | 41 | 19 | 24 | 14 | 19 |

[1]Not measured - Compound did not cure.

Example 7

Composition B30, a polyamide-filled acrylate copolymer composition composed of 62.5 wt. % acrylate copolymer A1 and 37.5 wt. % polyamide P3 (nylon 6) was produced by extrusion using a 25 mm Berstorff twin screw extruder operated at a screw speed of 200 rpm, an extrusion rate of 11.8 kg/hour and a melt temperature of 260° C. The blend was cooled to 25° C. before further processing. Composition B31, a polyamide-filled acrylate copolymer composition composed of 55 wt. % acrylate copolymer A1 and 45 wt. % polyamide P3 (nylon 6) was produced by Blend Method E, described in Example 1. Green strength of the polymer blend compositions B30 and B31 are reported in Table 11.

TABLE 11

| | Composition | |
|---|---|---|
| | B30 % | B31 % |
| A1 | 62.5 | 55 |
| P3 | 37.5 | 45 |
| Green strength (MPa) | 0.5 | 0.5 |
| Crystallization peak temperature (° C.) | nm | 100 |

Compositions B30 and B31 were mixed on a roll mill with the ingredients and amounts shown in Table 12 to produce curable acrylate copolymer compositions E11, E12, and E13. Cure response and physical properties of the cured blends before and after aging are shown in Table 12. The heat aging results shown in Table 12 indicate AO-2 is the most effective of the three antioxidants for the cured polyamide-filled acrylate copolymer compositions tested.

TABLE 12

| | Composition | | |
|---|---|---|---|
| | E11 phr | E12 phr | E13 phr |
| B30 | 160 | | |
| B31 | | 181.82 | 181.82 |
| Curative 1 | 0.6 | 0.6 | 0.6 |
| Accelerator 1 | 1 | 1 | 1 |
| Scorch retarder | 0.5 | | 0.5 |
| AO-1 | 2 | | |
| AO-2 | | 2 | |
| AO-3 | | | 2 |
| Process aid | 1 | 0.5 | 0.5 |

TABLE 12-continued

| | Composition | | |
|---|---|---|---|
| | E11 phr | E12 phr | E13 phr |
| Cure response | | | |
| ML (dN-m) | 0.55 | 0.8 | 1.9 |
| MH (dN-m) | 12.1 | 11.5 | 12.5 |
| Tensile Properties and Shore A Hardness after Press Cure and Post Cure | | | |
| Shore A | 65 | 67 | 67 |
| Tb (MPa) | 18.5 | 15.1 | 14.6 |
| Eb (%) | 280 | 262 | 227 |
| Tensile Properties and Shore A Hardness after 3 weeks 190° C. heat aging | | | |
| Shore A | 54 | 60 | 57 |
| Tb (MPa) | 5.2 | 8.7 | 4.6 |
| Eb (%) | 122 | 142 | 101 |
| Change in Shore A, Tb, and Eb after 3 weeks 190° C. heat aging | | | |
| Shore A (points) | −11 | −7 | −10 |
| Tb (%) | −72 | −42 | −68 |
| Eb (%) | −56 | −46 | −56 |

Example 8

Compositions B32 and B33 are polyamide-filled acrylate copolymer compositions composed of 60 wt. % acrylate copolymer A1 and 40 wt. % polyamide P8 or 40 wt. % of polyamide P3, respectively. B32 was produced using Blend Method M described in Example 1, while B33 was produced by Blend Method E of Example 1. Polyamide P8 is an amorphous polyamide having a glass transition midpoint temperature of 125° C., whereas polyamide P3 has a melting peak temperature above 160° C. B33 was further characterized by a green strength of 0.4 MPa and a crystallization peak temperature of 95° C.

Curable acrylate copolymer compositions CE18 and E14 were prepared by mixing B32 with the ingredients listed in Table 13 using a roll mill. CE18 exhibits a poor cure response because the polyamide P8 is fluid at the cure temperature, whereas E14 provides a high state of cure even though E14 contains less curative than CE18.

TABLE 13

| | Curable composition | |
|---|---|---|
| | CE18 phr | E14 Phr |
| B32 | 166.67 | |
| B33 | | 166.67 |
| Curative 1 | 0.6 | 0.45 |
| Accelerator 1 | 1 | 1 |
| Scorch retarder | 0.5 | 0.5 |
| Process aid | 0.5 | 0.5 |
| AO-1 | 2 | 2 |
| Cure response | | |
| ML (dN-m) | 1.2 | 0.9 |
| MH (dN-m) | 3.1 | 7.9 |
| MH − ML | 1.9 | 7 |

Example 9

A series of polyamide-filled acrylate copolymers, B34-B48, was prepared by mixing 60 parts of an acrylate copolymer (A1, A2 or A4) with 40 parts of a polyamide (P1, P2, P3, P5, or P7). Blend B3 from Table I is included in this series as well. The polyamide-filled acrylate copolymer blends were prepared using Blend Method M described in Example 1. Table 14 lists the blend compositions prepared, along with the green strength and Mooney viscosity of the blends. These results show that acrylate copolymer A1 forms blends comprising 40% by weight polyamide having low green strength and Mooney viscosity when the polyamide has an inherent viscosity greater than about 0.9 dL/g. Acrylate copolymer A2 forms blends comprising 40% by weight polyamide having low green strength and Mooney viscosity using any of the polyamide types tested. Acrylate copolymer A4 forms blends comprising 40% by weight polyamide having low green strength and Mooney viscosity using only polyamides having inherent viscosity greater than 1.3 dL/g.

Curable compositions and their properties based on certain blends of Table 14 are shown in Table 15 (similar results for blend B3 can be found in Table 2, compound CE3). These results show that polyamide-filled acrylate co-polymers, within a given type of acrylate co-polymer, exhibit superior elastic properties such as Eb and compression set resistance when the green strength of the blend is less than about 2 MPa.

TABLE 14

| | Composition | | | | | | | | | | | | | | | |
|---|---|---|---|---|---|---|---|---|---|---|---|---|---|---|---|---|
| | B3 % | B34 % | B35 % | B36 % | B37 % | B38 % | B39 % | B40 % | B41 % | B42 % | B43 % | B44 % | B45 % | B46 % | B47 % | B48 % |
| A1 | 60 | 60 | 60 | 60 | 60 | | | | | | | | | | | |
| A2 | | | | | | 60 | 60 | 60 | 60 | 60 | 60 | | | | | |
| A4 | | | | | | | | | | | | 60 | 60 | 60 | 60 | 60 |
| P1 | 40 | | | | | 40 | | | | | | | | | | |
| P2 | | 40 | | | | | 40 | | | | | 40 | | | | |
| P7 | | | 40 | | | | | 40 | | | | | 40 | | | |
| P3 | | | | | | | | | 40 | | | | | 40 | | |
| P5 | | | | 40 | | | | | | 40 | | | | | 40 | |
| P9 | | | | | 40 | | | | | | 40 | | | | | 40 |
| Green strength (MPa) | 2.5 | 0.5 | 0.5 | 0.8 | 0.5 | 0.4 | 0.3 | 0.3 | 0.3 | 0.4 | 0.3 | 2.9 | 2.9 | 1 | 3.6 | 1 |
| Mooney Viscosity (Mooney units) | >220 | 71 | 71 | 76 | 69 | 40 | 42 | 41 | 40 | 49 | 43 | 137 | 126 | 57 | >220 | 58 |

TABLE 15

| | Composition | | | | | |
|---|---|---|---|---|---|---|
| | E15 phr | E16 phr | E17 phr | CE19 phr | E18 phr | E19 phr |
| B37 | 166.67 | | | | | |
| B38 | | 166.67 | | | | |
| B43 | | | 166.67 | | | |
| B44 | | | | 166.67 | | |
| B46 | | | | | 166.67 | |
| B48 | | | | | | 166.67 |
| curative 1 | 0.6 | 0.6 | 0.6 | 0.6 | 0.6 | 0.6 |
| accelerator 1 | 1 | 1 | 1 | 1 | 1 | 1 |
| scorch retarder | 0.5 | 0.5 | 0.5 | 0.5 | 0.5 | 0.5 |
| process aid | 0.5 | 0.5 | 0.5 | 0.5 | 0.5 | 0.5 |
| AO-1 | 2 | 2 | 2 | 2 | 2 | 2 |
| Cure response | | | | | | |
| ML (dN-m) | 1.8 | 0.9 | 1.4 | 2.9 | 1.5 | 1.9 |
| MH (dN-m) | 12.8 | 7.6 | 7.9 | 14.5 | 8.1 | 8 |
| Shore A hardness and tensile properties after press cure and post cure | | | | | | |
| Shore A | 65 | 65 | 62 | 80 | 64 | 67 |
| M25 (MPa) | 1.3 | 1.5 | 1 | 12.8 | 4.2 | 4.9 |
| Tb (MPa) | 15.4 | 9.2 | 11.7 | 20.5 | 12.9 | 12.6 |
| Eb (%) | 235 | 215 | 230 | 50 | 90 | 80 |
| Compression set, 70 hours at 175° C. | | | | | | |
| (%) | 30 | 40 | 59 | 83 | 56 | 63 |

Example 10

A polymer blend composition, B49 composed of 73.4 wt. % acrylate copolymer A1 and 26.6 wt. % polyamide 4 was produced on a 25 mm Berstorff twin screw extruder that was operated at 150 rpm with a total polymer output of 11.8 kg/hr. Melt temperature of the blend was 282° C. The polymer blend composition was extruded onto a water cooled belt and cooled to room temperature (about 25° C.). Composition and physical properties of B49 are shown in Table 16.

TABLE 16

| | Composition B49 % |
|---|---|
| A1 | 73.4 |
| P4 | 26.6 |
| Green strength (MPa) | 0.4 |

TABLE 16-continued

| | Composition B49 % |
|---|---|
| Mooney viscosity | 52 |
| Crystallization peak temperature (° C.) | 112 |

Curable acrylate copolymer compositions E20, E21, and E22, having compositions as shown in Table 17, were prepared on a roll mill using B49 as the polymer blend component. A curable acrylate copolymer composition CE20 was prepared in the same manner using acrylate copolymer A1 and carbon black, a conventional reinforcing filler. All the compositions in Table 17 cure well and have good initial physical properties. E20, E21, and E22 retain tensile elongation at break greater than 100% after heat aging 3 weeks at 190° C., whereas CE20 exhibits tensile elongation at break of less than 100% after heat aging for only two weeks at 190° C.

TABLE 17

| | Composition | | | |
|---|---|---|---|---|
| | E20 phr | E21 phr | E22 phr | CE20 phr |
| B49 | 136.2 | 136.2 | 136.2 | |
| A1 | | | | 100 |
| Curative 1 | 0.55 | 0.7 | 0.95 | 1.1 |
| Accelerator 1 | 2 | 1 | 1 | 2 |
| Scorch retarder | 0.5 | 0.5 | 0.5 | |
| Process aid | 0.5 | 0.5 | 0.5 | 0.5 |
| AO-1 | 2 | 2 | 2 | 4 |
| N550 carbon black | | | | 45 |
| Cure response | | | | |
| ML (dN-m) | 0.7 | 0.7 | 0.6 | 0.7 |
| MH (n-m) | 7.8 | 9.7 | 10.2 | 12.9 |
| T'50 (min) | 3.2 | 4.3 | 5.3 | 2.5 |
| T'90 (min) | 9.7 | 13.9 | 16.1 | 7.7 |
| Tensile properties and Shore A hardness after press cure and post cure | | | | |
| Shore A Hardness | 54 | 54 | 54 | 66 |
| M50 (MPa) | 1.1 | 1.2 | 1.2 | 1.9 |
| M100 (MPa) | 2.0 | 2.2 | 2.4 | 4 |
| M200 (MPa) | 6.4 | 8.0 | 10.0 | 11.6 |
| Tb (MPa) | 16.4 | 17.3 | 19.7 | 24 |
| Eb (%) | 320 | 300 | 270 | 400 |
| Tensile properties and Shore A hardness after 2 weeks heat aging at 190° C. | | | | |
| Shore A | 47 | 50 | 50 | 75 |
| M50 (MPa) | 0.8 | 0.8 | 0.9 | 4.4 |
| M100 (MPa) | 1.5 | 1.4 | 1.7 | |
| M200 (MPa) | 5.4 | 5 | 7.6 | |
| Tb (MPa) | 5.9 | 8.7 | 8.6 | 6.4 |
| Eb (%) | 210 | 250 | 210 | 80 |
| Change in Eb and Shore A | | | | |
| Eb (%) | −34 | −17 | −22 | −80 |
| Shore A (pts.) | −7 | −4 | −4 | 9 |
| Tensile properties and Shore A hardness after 3 weeks heat aging at 190° C. | | | | |
| Shore A | 45 | 47 | 48 | Not Tested |
| M50 (MPa) | 0.9 | 0.8 | 0.9 | |
| M100 (MPa) | 2.1 | 2 | 2.1 | |
| Tb (MPa) | 3.7 | 2.6 | 3 | |
| Eb (%) | 130 | 110 | 115 | |
| Compression set, 25% compression, 70 hrs. at 150 C. | | | | |
| (%) | 20 | 14 | 14 | 20 |

Example 11

A series of curable polyamide filled acrylate copolymers was prepared by blending composition B8, a blend of 60 wt. % polyamide and 40 wt. % acrylate copolymer A1 described in Example 1, with sufficient gum acrylate rubber to lower the polyamide content in the polyamide-filled acrylate copolymer composition to 40 wt. %. This mixing process was conveniently accomplished via mill mixing at a temperature less than 160° C., i.e. less than the melting peak temperature of the polyamide. Curative and other ingredients were added while the dilution occurred. The curable compositions and their properties are shown in Table 18. Compositions E23, E24, and E25, exhibit good cure response, compression set resistance and tensile properties both initially and after heat aging for two weeks at 190° C.

TABLE 18

| | Composition | | |
|---|---|---|---|
| | E23 phr | E24 phr | E25 phr |
| B8 | 111.11 | 111.11 | 111.11 |
| A1 | 55.55 | | |
| A3 | | 55.55 | |
| A4 | | | 55.55 |
| Curative 1 | 0.6 | 0.6 | 0.6 |
| Accelerator 1 | 1 | 1 | 1 |
| Scorch retarder | 0.5 | 0.5 | 0.5 |
| Process aid | 1 | 1 | 1 |
| AO-1 | 2 | 2 | 2 |
| Cure response | | | |
| ML (dN-m) | 0.96 | 1.3 | 1.3 |
| MH (dN-m) | 11.3 | 10.5 | 10.3 |
| Tensile properties and Shore A hardness after press cure and post cure | | | |
| Shore A | 63 | 61 | 60 |
| Tb (MPa) | 21.3 | 17.5 | 18.4 |
| Eb (%) | 270 | 170 | 195 |
| Tensile Properties and Shore A hardness after 2 Weeks at 190° C. hot air aging | | | |
| Shore A | 55 | 52 | 52 |
| M25 (MPa) | 0.74 | 0.71 | 0.68 |
| M50 (MPa) | 1.2 | 1.5 | 1.3 |
| M100 (MPa) | 3.3 | 6.3 | 5.3 |
| Tb (MPa) | 6.5 | 8.3 | 7.8 |
| Eb (%) | 135 | 116 | 125 |
| Compression Set, 70 hours at 175° C. | | | |
| (%) | 34 | 30 | 28 |

Example 12

Two polyamide-filled acrylate copolymer blend compositions, B50 and B51 having compositions in weight percent as shown in Table 19 were prepared using Blend Method M of Example 1.

TABLE 19

| | Composition | |
|---|---|---|
| | B50<br>% | B51<br>% |
| A3 | 80 | |
| A4 | | 80 |
| P2 | 20 | 20 |
| Green strength (MPa) | 0.1 | 0.3 |
| Crystallization peak temperature (° C.) | 82 | 80 |

Curable polyamide-filled acrylate copolymer compounds were produced by roll mill mixing B50 and B51 with the ingredients shown in Table 20. Compositions CE21 and CE22 comprise a high level (55 phr) of N550 carbon black filler and no polyamide, compositions CE23 and CE24 comprise a low level (15 phr) of N550 carbon black filler and no polyamide, compositions CE25 and CE26 are free of carbon black or polyamide fillers, and compositions E26 and E27 comprise polyamide and a low level (15 phr) of N550 carbon black filler. The contribution to Shore A hardness attributable to 15 phr and 55 phr carbon black in the cured acrylate copolymer compositions can be computed by subtraction of the Shore A hardness of the compounds free of carbon black from the Shore A hardness of the corresponding compounds comprising solely carbon black filler. Using this method of computation indicates that the presence of 55 phr N550 in the acrylate copolymer compositions increases Shore A hardness by more than 40 points, whereas the presence of 15 phr increases Shore A hardness by 10 to 11 points, depending on the acrylate copolymer in the composition.

Because E26 and E27 rely on carbon black for only a minor amount of reinforcement, they exhibit heat aging superior to that of CE21 and CE22 as indicated by the lower percent change in elongation at break and Shore A hardness after heat aging for 3 weeks at 190° C.

TABLE 20

| | Composition | | | | | | | |
|---|---|---|---|---|---|---|---|---|
| | CE21<br>phr | CE22<br>phr | CE23<br>phr | CE24<br>phr | CE25<br>phr | CE26<br>phr | E26<br>phr | E27<br>phr |
| A3 | 100 | | 100 | | 100 | | | |
| A4 | | 100 | | 100 | | 100 | | |
| B50 | | | | | | | 125 | |
| B51 | | | | | | | | 125 |
| Curative 1 | 0.6 | 0.6 | 0.6 | 0.6 | 0.6 | 0.6 | 0.6 | 0.6 |
| Accelerator 1 | 1 | 1 | 1 | 1 | 1 | 1 | 1 | 1 |
| Scorch retarder | 0.6 | 0.6 | 0.6 | 0.6 | 0.6 | 0.6 | 0.6 | 0.6 |
| AO-1 | 2 | 2 | 2 | 2 | 2 | 2 | 2 | 2 |
| process aid | 0.5 | 0.5 | 0.5 | 0.5 | 0.5 | 0.5 | 0.5 | 0.5 |
| N550 carbon black | 55 | 55 | 15 | 15 | | | 15 | 15 |
| Cure response | | | | | | | | |
| ML (dN-m) | 1.1 | 0.9 | 0.7 | 0.8 | 0.4 | 0.5 | 1.1 | 0.8 |
| MH (dN-m) | 8.3 | 7.9 | 3.7 | 3.7 | 2.4 | 2.5 | 5.8 | 5.3 |
| Shore A hardness and tensile properties after press cure and post cure | | | | | | | | |
| Shore A (1 sec) | 59 | 62 | 27 | 26 | 17 | 15 | 42 | 47 |
| M50 (MPa) | 1.4 | 1.5 | 0.5 | 0.4 | 0.2 | 0.2 | 1.7 | 1.9 |
| M100 (MPa) | 3.1 | 3.3 | 0.9 | 0.7 | 0.4 | 0.3 | 4.7 | 5.13 |
| M200 (MPa) | 9 | 9.8 | 3.4 | 2.1 | 1 | 0.5 | | 12.2 |
| Tb (MPa) | 12.5 | 12.8 | 6.1 | 4.7 | 1.4 | 1.1 | 11.1 | 12.6 |
| Eb (%) | 280 | 270 | 275 | 295 | 250 | 280 | 190 | 210 |
| Shore A points attributable to N550 carbon black | 42 | 47 | 10 | 11 | 0 | 0 | 10 | 11 |
| Heat Aged 3 weeks at 190° C. | | | | | | | | |
| Shore A | 85 | 75 | Not | Not | not | Not | 46 | 47 |
| M50 (MPa) | 6.3 | 5 | Tested | Tested | tested | Tested | 1.3 | 1.2 |
| M100 (MPa) | | | | | | | 4 | 3 |
| Tb (MPa) | 7.1 | 6.4 | | | | | 4.6 | 6.2 |
| Eb (%) | 70 | 90 | | | | | 120 | 180 |
| Change in Shore A hardness after 3 weeks at 190 C. | | | | | | | | |
| Points | 26 | 13 | | | | | 4 | 0 |
| % Change in Eb after 3 weeks at 190° C. | | | | | | | | |
| % change | −75 | −67 | | | | | −37 | −14 |

Example 13

A series of curable polyamide-filled acrylate copolymers, E28-E30 and CE27, was prepared by compounding composition B31, prepared as described in Example 7, with the ingredients shown in Table 21 on a rubber mill. Composition B31 comprises 45 weight % polyamide P3 and 55 wt. % acrylate copolymer A1. A second series of curable acrylate copolymers, CE28-CE32 was prepared in substantially the same manner except that carbon black was utilized as a filler in place of polyamide. As shown in Table 21, for curable copolymer compositions E28-E30 and CE27, the polyamide content of B31 is successively diluted with increasing amounts of acrylate copolymer while the concentration of N550 carbon black increases to maintain an approximately constant Shore A hardness in the cured compositions. CE28-CE31 comprise only carbon black as a reinforcing filler, while CE32 is an unreinforced compound that contains neither carbon black nor polyamide fillers. The Shore A hardness values of CE28-CE32 permit calculation of the Shore A hardness points contributed by the N550 carbon black, ranging from zero points for E28 to 28 points for CE28.

After two and three weeks of hot air aging at 190° C., cured samples of E28-E30, wherein carbon black contributes less than about 20 points Shore A hardness, exhibit greater tensile strength and elongation than cured samples of CE27 and CE28, which derive more than 20 points Shore A hardness from carbon black. Cured samples of E28-E30 also exhibit less change in Shore A hardness during heat aging than cured samples of CE27 and CE28.

TABLE 21

| | Composition | | | | | | | | |
|---|---|---|---|---|---|---|---|---|---|
| | E28 phr | E29 phr | E30 phr | CE27 phr | CE28 phr | CE29 phr | CE30 phr | CE31 phr | CE32 phr |
| B31 | 181.8 | 133.3 | 88.9 | 44.4 | 0 | | | | |
| A1 | | 26.7 | 51.1 | 75.6 | 100 | 100 | 100 | 100 | 100 |
| Curative 1 | 1 | 1 | 1 | 1 | 1 | 1 | 1 | 1 | 1 |
| Accelerator 1 | 1 | 1 | 1 | 1 | 1 | 1 | 1 | 1 | 1 |
| AO-2 | 1 | 1 | 1 | 1 | 1 | 1 | 1 | 1 | 1 |
| Process aid | 0.5 | 0.5 | 0.5 | 0.5 | 0.5 | 0.5 | 0.5 | 0.5 | 0.5 |
| N550 carbon black | 0 | 15 | 25 | 35 | 45 | 15 | 25 | 35 | |
| Cure response | | | | | | | | | |
| ML (dN-m) | 1.7 | 1.3 | 1.1 | 0.9 | 0.9 | 0.4 | 0.5 | 0.7 | 0.3 |
| MH (dN-m) | 18.4 | 17.4 | 15.6 | 14.2 | 12.2 | 7.3 | 8.9 | 10.2 | 5.4 |
| Shore A hardness and tensile properties after press cure and post cure | | | | | | | | | |
| Shore A | 68 | 67 | 67 | 65 | 65 | 47 | 53 | 60 | 37 |
| Tb (MPa) | 23.5 | 22.1 | 22.6 | 23.7 | 23.7 | 18.1 | 22.6 | 23.6 | 2.3 |
| Eb (%) | 230 | 229 | 290 | 345 | 425 | 520 | 510 | 475 | 450 |
| Shore A points attributable to N550 | 0 | 10 | 16 | 23 | 28 | 10 | 16 | 23 | 0 |
| Shore A and tensile properties after 2 weeks hot air aging at 190° C. | | | | | | | | | |
| Shore A | 65 | 65 | 68 | 70 | 80 | | | | |
| Tb (MPa) | 11.5 | 14.9 | 13.6 | 10.7 | 4.9 | | | | |
| Eb (%) | 150 | 160 | 145 | 115 | 35 | | | | |
| Shore A and tensile properties after 3 weeks hot air aging at 190° C. | | | | | | | | | |
| Shore A | 62 | 65 | 68 | 77 | 88 | | | | |
| Tb (MPa) | 8.4 | 9.6 | 5.9 | 5 | 5.5 | | | | |
| Eb (%) | 120 | 105 | 70 | 45 | 5 | | | | |

Example 14

A series of curable polyamide-filled acrylate copolymers, E31-E33, was prepared by compounding composition B31, prepared as described in Example 7, with the ingredients shown in Table 22 on a rubber mill. Composition B31 comprises 45 weight % polyamide P3 and 55 wt. % acrylate copolymer A1. A second series of curable acrylate copolymers, CE33-CE36 was prepared in substantially the same manner except that N990 carbon black was utilized as a filler in place of polyamide. As shown in Table 22, for curable copolymer compositions E31-E33 the polyamide content of B31 is successively diluted with increasing amounts of acrylate copolymer while the concentration of N990 carbon black increases to maintain an approximately constant Shore A hardness in the cured compositions. CE33-CE36 comprise only carbon black as a reinforcing filler. CE32 (see Example 13) is used as the unreinforced reference compound that contains neither carbon black nor polyamide fillers.

N990 carbon black is less reinforcing than N550, and therefore more N990 is needed to increase the Shore A hardness of the cured compound. Compounds E31-E33 derive less than 20 points Shore A hardness from the N990 carbon black, and therefore exhibit better resistance to hot air aging at 190° C. for two to three weeks than CE33.

TABLE 22

| | Composition | | | | | | |
|---|---|---|---|---|---|---|---|
| | E31 phr | E32 phr | E33 Phr | CE33 Phr | CE34 phr | CE35 phr | CE36 phr |
| B31 | 133.3 | 88.9 | 44.4 | | | | |
| A1 | 26.7 | 51.1 | 75.6 | 100 | 100 | 100 | 100 |
| Curative 1 | 1 | 1 | 1 | 1 | 1 | 1 | 1 |
| Accelerator 1 | 1 | 1 | 1 | 1 | 1 | 1 | 1 |
| AO-2 | 1 | 1 | 1 | 1 | 1 | 1 | 1 |
| Process aid | 0.5 | 0.5 | 0.5 | 0.5 | 0.5 | 0.5 | 0.5 |
| N990 carbon black | 25 | 45 | 60 | 80 | 25 | 45 | 60 |
| Cure response | | | | | | | |
| ML (dN-m) | 1.5 | 1.05 | 0.78 | 0.65 | 0.36 | 0.45 | 0.51 |
| MH (dN-m) | 17.1 | 16 | 14.1 | 12.5 | 7.3 | 9 | 10.8 |
| Shore A hardness and tensile properties after press cure and post cure | | | | | | | |
| Shore A | 67 | 65 | 61 | 61 | 44 | 49 | 54 |
| Tb (MPa) | 20.9 | 18 | 15.3 | 12.3 | 12.4 | 13.5 | 13.5 |
| Eb (%) | 250 | 290 | 335 | 385 | 485 | 470 | 475 |
| Shore A points attributable to N990 | 7 | 12 | 17 | 24 | 7 | 12 | 17 |
| Shore A and tensile properties after 2 weeks hot air aging at 190 C. | | | | | | | |
| Shore A | 59 | 64 | 63 | 67 | | | |
| Tb (MPa) | 13.4 | 12.2 | 11.5 | 4.1 | | | |
| Eb (%) | 170 | 160 | 165 | 60 | | | |
| Shore A and tensile properties after 3 weeks hot air aging at 190 C. | | | | | | | |
| Shore A | 61 | 64 | 65 | 81 | | | |
| Tb (MPa) | 8.7 | 8 | 5.3 | 4.1 | | | |
| Eb (%) | 115 | 110 | 75 | 20 | | | |

Example 15

Curable polyamide-filled acrylate copolymers, E34, E35, and CE40, were prepared by mill mixing polyamide-filled polyacrylate copolymer composition B31, prepared as described in Example 7, with varying levels of silica filler and gum acrylate copolymer A1. Composition B31 comprises 45 weight % polyamide P3 and 55 wt. % acrylate copolymer A1. Curable acrylate copolymer compounds CE37-CE39 were mill mixed in the same manner except that silica was utilized as the only filler in the compound, so that the increase in Shore A hardness attributable to the silica filler can be determined. The ingredients in the curable compositions are shown in Table 23. Curable copolymer compositions E34-E35 and CE40 contain increasing levels of silica filler, such that the silica contributes 8, 15, and 23 points Shore A hardness respectively to the cured compound. CE32 (see Example 13) was used as the unreinforced reference compound that contains neither polyamide nor silica. Compounds E34 and E35 derive less than 20 points Shore A hardness from silica, and therefore exhibit better resistance to hot air aging for two to three week at 190° C. than CE40.

TABLE 23

| | Composition | | | | | |
|---|---|---|---|---|---|---|
| | CE37 phr | CE38 phr | CE39 phr | E34 phr | E35 phr | CE40 phr |
| B31 | | | | 88.9 | 74.1 | 88.9 |
| A1 | 100 | 100 | 100 | 51.1 | 59.2 | 51.1 |
| Curative 1 | 1 | 1 | 1 | 1 | 1 | 1 |
| Accelerator 1 | 1 | 1 | 1 | 1 | 1 | 1 |
| AO-2 | 1 | 1 | 1 | 1 | 1 | 1 |
| Process aid | 0.5 | 0.5 | 0.5 | 0.5 | 0.5 | 0.5 |
| Silica | 12 | 24 | 36 | 12 | 24 | 36 |

TABLE 23-continued

| | Composition | | | | | |
|---|---|---|---|---|---|---|
| | CE37 phr | CE38 phr | CE39 phr | E34 phr | E35 phr | CE40 phr |
| Cure response | | | | | | |
| ML (dN-m) | 0.4 | 0.6 | 1.5 | 0.9 | 1.3 | 2.5 |
| MH (dN-m) | 5 | 4.5 | 7.9 | 10.2 | 8.7 | 13.2 |
| Shore A hardness and tensile properties after press cure and post cure | | | | | | |
| Shore A | 45 | 52 | 60 | 65 | 65 | 70 |
| Tb (MPa) | 14.1 | 16.6 | 19.1 | 18.7 | 18.3 | 18.4 |
| Eb (%) | 640 | 690 | 690 | 300 | 410 | 345 |
| Shore A points attributable to silica | 8 | 15 | 23 | 8 | 15 | 23 |
| Shore A and tensile properties after 2 weeks hot air aging at 190° C. | | | | | | |
| Shore A | | | | 60 | 64 | 68 |
| Tb (MPa) | | | | 10.9 | 12.2 | 12.3 |
| Eb (%) | | | | 165 | 165 | 110 |
| Shore A and tensile properties after 3 weeks hot air aging at 190° C. | | | | | | |
| Shore A | | | | 61 | 66 | 79 |
| Tb (MPa) | | | | 6.5 | 5.7 | 5.8 |
| Eb (%) | | | | 110 | 80 | 35 |

Example 16

Polyamide P3 was cryogenically ground so as to pass through a 60 mesh screen (0.31 mm opening). The ground polyamide was mixed with acrylate copolymer A1 in a ratio of 40 parts by weight polyamide to 60 parts by weight acrylate copolymer using a Haake® Rheocord mixing bowl operated at room temperature and 50 rpm rotor speed for three minutes. The temperature of the polymer composition remained less than 50° C. during the mixing process, so the polyamide did not melt. For comparison, the same composition was produced via blend method E of Example 1, in which the polyamide becomes melted. Table 24 summarizes the blends produced.

TABLE 24

| | Composition | |
|---|---|---|
| | B52 % | B53 % |
| A1 | 60 | 60 |
| P3 cryoground | 40 | |
| P3 pellets | | 40 |
| Mixing method | Low temperature mixing bowl, polyamide not Melted | High temperature extrusion, polyamide melted |
| Green strength (MPa) | 0.3 | 0.4 |

Compositions B52 and B53 were used to produce curable compositions CE41 and E36, respectively, as shown in Table 25. After press cure and post cure, CE41 exhibited low tensile strength, equal to that of CE32, an unreinforced compound comprising acrylate copolymer A1. Composition E36, however, exhibited high tensile strength.

TABLE 25

| | Composition | |
|---|---|---|
| | CE41 phr | E36 phr |
| B52 | 166.67 | |
| B53 | | 166.67 |
| Curative 1 | 0.6 | 0.6 |
| Accelerator 1 | 1 | 1 |
| Scorch retarder | 0.5 | 0.5 |
| Process aid | 0.5 | 0.5 |
| AO-1 | 2 | 2 |
| Cure response | | |
| ML (dN-m) | 0.5 | 0.6 |
| MH (dN-m) | 10.4 | 11.6 |
| Shore A hardness and tensile properties after press cure and post cure | | |
| Shore A | 63 | 64 |
| Tb (MPa) | 2.1 | 14.8 |
| Eb (%) | 203 | 235 |

Example 17

Polyamide-filled acrylate copolymer compositions B54, B55, and B56 were produced on a 25 mm Berstorff twin screw extruder operating at 150 rpm. The barrel temperatures were set to 10° C. above the melting peak temperature of the polyamide used in the blend. The blends were collected and cooled to about 25° C. Compositions and green strength of B54-B56 are shown in Table 26.

TABLE 26

| | Composition | | |
|---|---|---|---|
| | B54 % | B55 % | B56 % |
| A1 | 75 | | |
| A2 | | 60 | |
| A7 | | | 75 |
| P4 | | | 25 |
| P5 | | 40 | |
| P6 | 25 | | |
| Green strength (MPa) | 0.4 | 0.4 | 0.5 |

Blends B54-B56 were mixed on a roll mill to form curable compositions E37-E39, as shown in Table 27. Comparative curable compositions CE42-CE44 were prepared from the same acrylate copolymers as E37-E39, but contain carbon black as the sole reinforcing filler. All the curable compositions cure well and exhibit good properties after press cure and post cure. However, after 2 weeks at 190° C. hot air aging, cured compositions E37-E39 exhibit greater tensile strength and elongation than the respective cured comparative compositions that comprise the same acrylate copolymer and incorporate carbon black as a filler. Compositions E38 and CE43 comprise acrylate copolymer A2, which has a high level of copolymerized cure site monomer of about 1.3 mol %. As a result, the cured compositions comprising A2 exhibit a greater tendency to harden and embrittle during hot air aging than cured compositions based on acrylate copolymers comprising less than 1 mol % copolymerized cure site monomer.

TABLE 27

| | Composition | | | | | |
|---|---|---|---|---|---|---|
| | E37 phr | E38 phr | E39 phr | CE42 phr | CE43 phr | CE44 phr |
| B54 | 133.3 | | | | | |
| B55 | | 166.7 | | | | |
| B56 | | | 133.3 | | | |
| A1 | | | | 100 | | |
| A2 | | | | | 100 | |
| A7 | | | | | | 100 |
| Curative 1 | 0.6 | 1 | 0.6 | 0.6 | 1 | 0.6 |
| Accelerator 1 | 1 | 1 | 1 | 1 | 1 | 1 |
| AO-2 | 1 | 1 | 1 | 1 | 1 | 1 |
| Process aid | 0.5 | 1 | 0.5 | 0.5 | 1 | 0.5 |
| N550 carbon black | | | | 30 | 45 | 30 |
| Cure response | | | | | | |
| ML (dN-m) | 0.71 | 1.57 | 0.72 | 0.6 | 0.5 | 0.6 |
| MH (dN-m) | 8.4 | 13.9 | 8.3 | 5.8 | 7.8 | 5.3 |
| Shore A and tensile properties after press cure and post cure | | | | | | |
| Shore A | 54 | 62 | 54 | 56 | 67 | 59 |
| Tb (MPa) | 18.7 | 23.4 | 19 | 22.4 | 19.5 | 18.5 |
| Eb (%) | 360 | 230 | 340 | 625 | 360 | 515 |
| Shore A and tensile properties after 2 weeks at 190° C. hot air aging | | | | | | |
| Shore A | 47 | 63 | 50 | 63 | 88 | 66 |
| Tb (MPa) | 8.5 | 10 | 9.4 | 5.8 | 7.5 | 6.1 |
| Eb (%) | 230 | 105 | 220 | 120 | 40 | 110 |
| Change as a result of hot air aging | | | | | | |
| Shore A (pts) | −7 | 1 | −4 | 7 | 21 | 7 |
| Tb (%) | −55 | −57 | −51 | −74 | −62 | −67 |
| Eb (%) | −35 | −55 | −35 | −81 | −89 | −79 |

What is claimed is:

1. A process for production of a polyamide-filled acrylate copolymer composition, the process comprising the steps of:

A. providing a polymer blend composition comprising 1. 40 to 90 wt. % of one or more amorphous acrylate Copolymers comprising a) at least 50 wt. %, based on the total weight of the amorphous acrylate copolymer, of polymerized units of at least one monomer having the structure

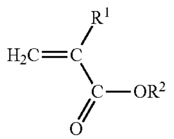

wherein $R^1$ is H or $C_1$-$C_{10}$alkyl and $R^2$ is $C_1C_{12}$ alkyl, $C_1$-$C_{20}$ alkoxyalkyl, $C_1$-$C_{12}$ cyanoalkyl, or $C_1$-$C_{12}$ fluoroalkyl; and b) copolymerized units of a cure site monomer selected from the group consisting of unsaturated carboxylic acids, anhydrides of unsaturated carboxylic acids, unsaturated epoxides, and mixtures of two or more thereof; and 2. 10-60 wt. % of one or more polyamides having a melting peek temperature greater than 16° C.;

wherein the weight percentages of the one or more amorphous acrylate copolymers and one or more polyamides are based on the combined weight of the one or more amorphous acrylate copolymers and the one or more polyamides in the polymer blend composition:

B. mixing the polymer blend composition at a temperature above the melting peak temperatures of the one or more polyamides to disperse the one or more polyamides within the one or more amorphous acrylate copolymers, thereby forming polyamide-filled acrylate copolymer composition; and C. cooling the polyamide-filled acrylate copolymer composition to a temperature below the crystallization peak temperatures of the one or more polyamides, thereby forming a polyamide-filled acrylate copolymer composition that i) comprises a continuous amorphous acrylate copolymer phase and a discontinuous polyamide phase and ii) has a green strength of less than about 2 MPa as determined according to ASTM D 6746-10.

2. The process of claim 1 wherein the one or more amorphous acrylate copolymers comprise copolymerized units of at least one monomer selected from the group consisting of alkyl acrylates, alkyl methacrylates, alkoxyalkyl acrylates, alkoxyalkyl methacrylates, and mixtures of two or more thereof.

3. The process of claim 1 wherein at least one of the one or more amorphous acrylate copolymers comprises a cure site monomer selected from the group consisting of 1,4-butenedioic acids, anhydrides of unsaturated carboxylic acids, monoalkyl esters of 1,4-butenedioic acid, and mixtures of two or more thereof.

4. The process of claim 1 wherein at least one of the one or more amorphous acrylate copolymers additionally comprises copolymerized units of an olefin.

5. The process of claim 1 wherein at least one of the one or more amorphous acrylate copolymers comprises a cure site monomer that is an unsaturated epoxide.

6. The process of claim 1 wherein at least one of the one or more polyamides is selected from the group consisting of i) polyamides formed by ring opening or condensation of aminocarboxylic acids and ii) polyamides having a melting peak temperature of less than 270° C. and an amine end group concentration of 60 meq/kg or less.

7. The process of claim 1 additionally comprising the step of adding an amine curative to the polyamide-filled acrylate copolymer composition after it has been cooled to a temperature below the crystallization peak temperatures of the one or more polyamides to form a curable polyamide-filled acrylate copolymer composition.

8. The process of claim 7 wherein the amine curative is a diamine carbamate.

9. The process of claim 7 wherein the amine curative is selected from the group consisting of hexamethylenediamine, hexamethylenediamine carbamate, and 2,2-bis[4-(4-aminophenoxy)phenyl]propane.

10. The process of claim 1 wherein the polymer blend composition additionally comprises a reinforcing filler selected from the group consisting of carbon black, amorphous precipitated and fumed silicas, crystalline silicas, clays, silicate minerals,titanium dioxide, wollastonite, antimony oxide, hydrated alumina, calcium carbonate,barium sulfate and mixtures thereof.

11. The process of claim 1 additionally comprising the step of adding an acrylate polymer to the polyamide-filled acrylate copolymer composition after said polyamide-filled acrylate copolymer composition has been cooled to a temperature below the crystallization peak temperatures of the one or more polyamides.

12. The process of claim 7, further comprising the steps of

D. curing the curable polyamide-filled acrylate copolymer composition by exposing the curable polyamide-filled acrylate copolymer composition to a temperature of about 160° C. to about 200° C. for about 2 to 60 minutes to form a crosslinked acrylate copolymer elastomer composition, and optionally exposing said crosslinked composition to post-cure heating at a temperature of about 160° C. to about 200° C., thereby forming an acrylate copolymer elastomer composition having a Shore A hardness of at least 40, as determined according to ASTM D2240-06 (1 second reading).

13. The process of claim 1 wherein at least one of the one or more polyamides has an inherent viscosity greater than 0.9 dL/g, as measured in accordance with ASTM D2857-95, using 96% by weight sulfuric acid as a solvent at a test temperature of 25° C.

14. The process of claim 7 wherein the curable polyamide-filled acrylate copolymer composition exhibits a cure response of at least 2.5 dN-m in accordance with ASTM D5289-07a using an MDR 2000 from Alpha Technologies operating at 0.5° arc and test conditions of 177° C. minutes.

* * * * *